(12) United States Patent
Tagome et al.

(10) Patent No.: US 7,675,566 B2
(45) Date of Patent: Mar. 9, 2010

(54) CAMERA MODULE

(75) Inventors: Masaki Tagome, Osaka (JP); Satoshi Tamaki, Osaka (JP); Takashi Haruguchi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 371 days.

(21) Appl. No.: 11/814,054

(22) PCT Filed: May 23, 2006

(86) PCT No.: PCT/JP2006/310260

§ 371 (c)(1),
(2), (4) Date: Jul. 16, 2007

(87) PCT Pub. No.: WO2006/126545

PCT Pub. Date: Nov. 30, 2006

(65) Prior Publication Data

US 2008/0158412 A1  Jul. 3, 2008

(30) Foreign Application Priority Data

May 24, 2005  (JP) .............................. 2005-151323

(51) Int. Cl.
*G02B 7/02* (2006.01)
*G03B 13/00* (2006.01)
*H04N 5/225* (2006.01)

(52) U.S. Cl. ...................... 348/357; 348/374; 359/814; 359/824

(58) Field of Classification Search ......... 348/345–361, 348/373–376; 359/814, 822–824; 396/144, 396/145

See application file for complete search history.

(56) References Cited

U.S. PATENT DOCUMENTS

| 5,289,318 | A | 2/1994 | Sekine et al. |
| 7,450,834 | B2 * | 11/2008 | Makii et al. .................. 396/55 |
| 2008/0259470 | A1 * | 10/2008 | Chung ........................ 359/823 |

FOREIGN PATENT DOCUMENTS

| JP | 54-135504 | 10/1979 |
| JP | 62-54839 | 3/1987 |
| JP | 4-121028 | 10/1992 |

(Continued)

*Primary Examiner*—Sinh Tran
*Assistant Examiner*—Mark Monk
(74) *Attorney, Agent, or Firm*—Hamre, Schumann, Mueller & Larson, P.C.

(57) ABSTRACT

A camera module 100 includes a movable section 10 that includes a lens 11, a fixed section 30 having a hollow space extending in the optical axis direction of the lens 11, and an elastic body 40 that elastically supports the movable section 10 and the fixed section 30, an imaging element 3 that is fixed to the fixed section 30 and has a light-receiving surface perpendicular to the optical axis of the lens 11, a plurality of magnets 31*a*, 31*b*, 31*c*, and 31*d* arranged along the fixed section 30, and a coil section 22 provided in the movable section 10. The elastic body 40 includes an upper spring 41*a* and a lower spring 41*b*, which support the fixed section 30 between adjacent ones of the magnets 31*a*, 31*b*, 31*c*, and 31*d* along the arrangement direction of these magnets on a plane perpendicular to the optical axis of the lens 11. With this configuration, it is possible to provide a camera module with an automatic focusing control function, whose thickness can be reduced remarkably.

9 Claims, 21 Drawing Sheets

FOREIGN PATENT DOCUMENTS

| | | |
|---|---|---|
| JP | 4-325930 | 11/1992 |
| JP | 2001-331954 | 11/2001 |
| JP | 2002-365514 | 12/2002 |
| JP | 2003-149537 | 5/2003 |
| JP | 2003-295033 | 10/2003 |
| JP | 2004-103086 | 4/2004 |
| JP | 2005-121893 | 5/2005 |
| JP | 2005-165058 | 6/2005 |

* cited by examiner

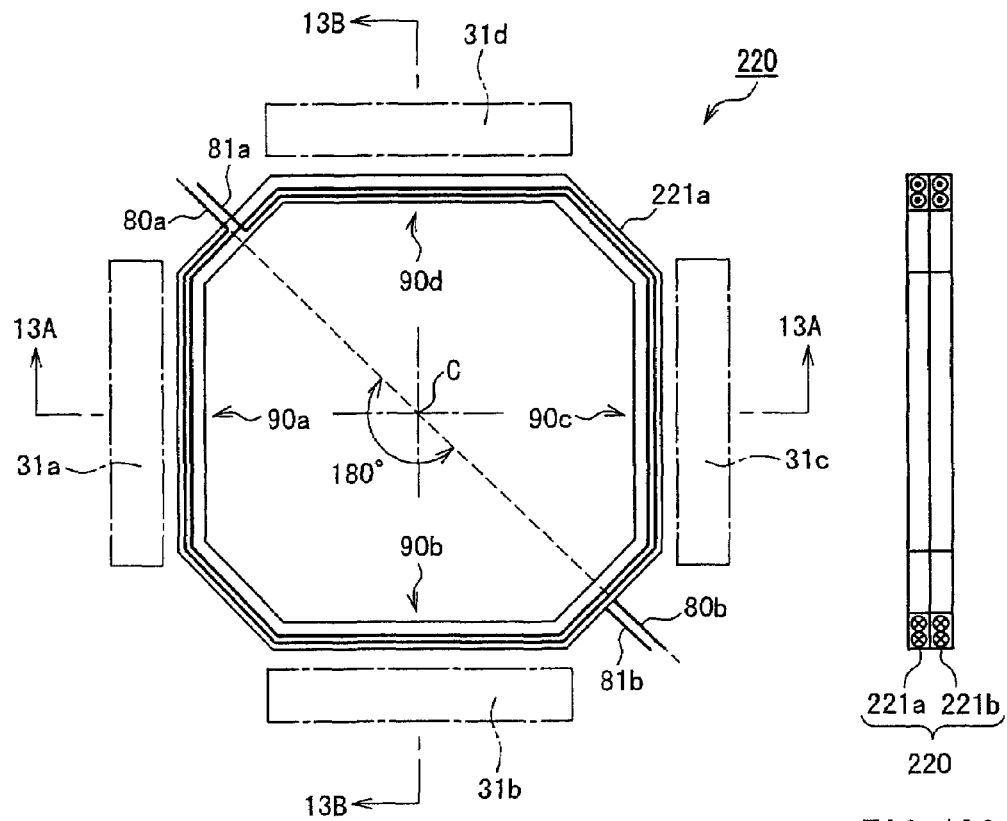
FIG. 13A
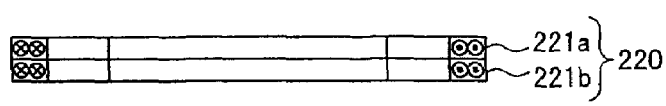
FIG. 13B
FIG. 13C

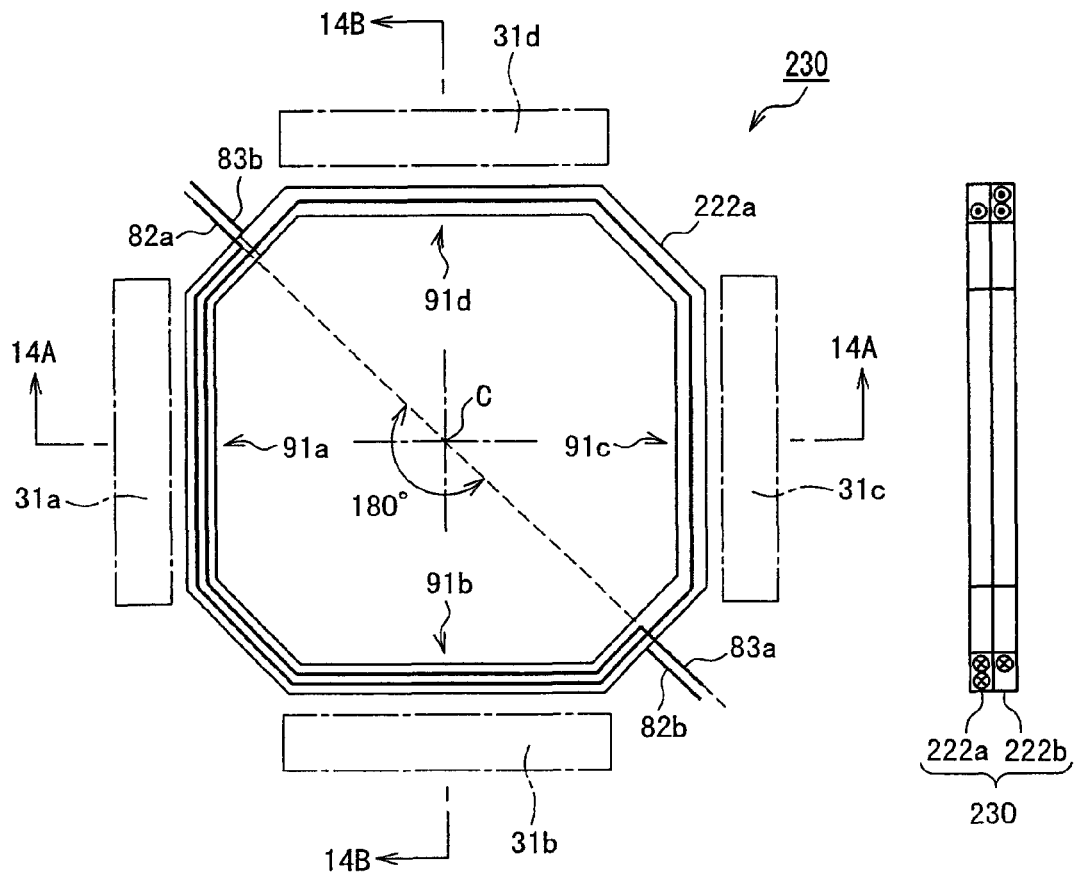
FIG. 14A
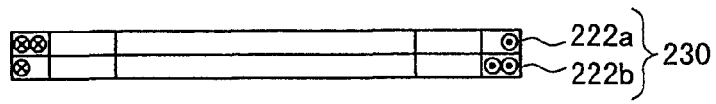
FIG. 14B
FIG. 14C

CAMERA MODULE

TECHNIQUE FIELD

The present invention relates to a small and thin camera module with an automatic focusing control function, capable of achieving low power consumption.

BACKGROUND ART

In recent years, portable equipment such as camera-equipped mobile phones has become widespread. Accompanying the reduction in size and thickness and the improvement in performance of such portable equipment, there has been a demand for smaller and thinner camera modules with a higher performance.

Heretofore, as camera modules, those having an automatic focus-adjusting system have been known (see Patent Document 1, for example).

FIG. 21 shows the configuration of a conventional camera module having an automatic focus-adjusting system. As shown in FIG. 21, in the conventional camera module, an objective lens 1005 is attached to an upper end portion of a cylindrical body 1011. An electromagnetic coil 1012 is wound around a lower end portion of this cylindrical body 1011. In FIG. 21, reference numeral 1013 denotes a magnet. One magnetic pole 1014a of this magnet 1013 extends toward the cylindrical body 1011 so as to have an L-shaped cross section, and the end portion thereof is inserted into the cylindrical body 1011 from below. The other magnetic pole 1014b of the magnet 1013 extends so as to face the magnetic pole 1014a and also extends upward such that the cylindrical body 1011 is surrounded by an outer peripheral portion of the magnetic pole 1014b. Thus, the magnetic poles 1014a and 1014b are arranged so as to face each other with the electromagnetic coil 1012 wound around the cylindrical body 1011 intervening therebetween. A cylindrical portion, which is a portion extending upward, of the magnetic pole 1014b serves as a lens system support 1015. A stepped portion 1015a is provided in a lower part of this lens system support 1015, and an outer peripheral portion of an elastic support 1016a is fixed firmly to this stepped portion 1015a. To an upper end portion of the lens system support 1015, an outer peripheral portion of an elastic support 1016b is fixed firmly. Inner peripheral portions of the respective elastic supports 1016a and 1016b are fixed firmly to the cylindrical body 1011. Thus, the cylindrical body 1011 to which the objective lens 1005 is attached is connected to the lens system support 1015 elastically via the elastic supports 1016a and 1016b.

In the camera module configured as above, by controlling a current flowing through the electromagnetic coil 1012, the cylindrical body 1011 is moved up and down (in the direction indicated with arrows in FIG. 21) due to a magnetic force caused by the magnet 1013 and a magnetic force caused by the electromagnetic coil 1012. The objective lens 1005 thus is moved in the optical axis direction, thereby achieving the automatic focus adjustment.

[Patent Document 1] JP 54 (1979)-135504 A

DISCLOSURE OF INVENTION

Problem to be Solved by the Invention

However, when the magnet 1013, the elastic supports 1016a and 1016b, etc. are stacked along the optical axis direction of the objective lens 1005 as in the conventional camera module, there arises a problem in that the thickness of the camera module cannot be made smaller than the total thickness of the respective components including the magnet 1013, the elastic supports 1016a and 1016b, etc. Furthermore, in order to make the camera module smaller and thinner, the thickness of the magnet 1013, which constitutes a large proportion in the thickness direction of the camera module, needs to be set small. However, the thickness of the magnet 1013 is determined depending on the working limits etc. at the time of mass production. Therefore, when the camera module is configured so that the components other than the magnet 1013 are stacked on the magnet 1013, it becomes difficult to reduce the thickness of the camera module.

The present invention has been made to solve the above-described problem in the prior art, and it is an object of the present invention to provide a camera module with an automatic focusing control function, whose thickness can be reduced remarkably.

Means for Solving Problem

In order to achieve the above object, the present invention provide a camera module including: a movable section that comprises at least one lens and can be moved in an optical axis direction of the lens; a fixed section having a hollow space extending in the optical axis direction of the lens so as to allow movement of the movable section; at least one elastic body that elastically supports the movable section and the fixed section; an imaging element that is fixed to the fixed section and has a light-receiving surface substantially perpendicular to the optical axis of the lens; a plurality of magnets arranged along the fixed section; a coil provided in the movable section; a driving element for supplying electric power to the coil; and an arithmetic element that performs image processing based on an electric signal input to the arithmetic element from the imaging element. In this camera module, the fixed section supports the elastic body between adjacent ones of the magnets along an arrangement direction of the magnets.

As described above, in the camera module of the present invention, the movable section, which includes the lens, and the fixed section are supported by the elastic body alone. Furthermore, the fixed section supports the elastic body between adjacent ones of the magnets along the arrangement direction of the magnets.

EFFECTS OF THE INVENTION

According to the present invention, the position of the elastic body in the optical axis direction of the lens does not depend on the thickness of the magnets etc., and it becomes possible to provide a camera module with an automatic focusing control function whose thickness has been reduced remarkably.

BRIEF DESCRIPTION OF DRAWINGS

FIG. 1 shows the configuration of a camera module according to a first embodiment of the present invention (FIG. 1A is a plan view showing the configuration of this camera module, FIG. 1C is a bottom view showing the configuration of the camera module, and FIG. 1B is a sectional view taken in the arrow direction of line 1A-1A in FIG. 1A and FIG. 1C.

FIG. 3 is a perspective view showing the positional relationship between an upper spring and a lower spring in the camera module according to the first embodiment of the present invention.

FIG. 4 is a plan view showing an upper spring included in an elastic body of a camera module according to a second embodiment of the present invention.

FIG. 5 is a plan view showing another example of the upper spring included in the elastic body of the camera module according to the second embodiment of the present invention.

FIG. 6 is a plan view showing an upper spring included in an elastic body of a camera module according to a third embodiment of the present invention.

FIG. 7 is a plan view showing an upper spring included in an elastic body of a camera module according to a fourth embodiment of the present invention.

[FIG. 8]

FIG. 9 is a plan view showing another example of the upper spring included in the elastic body of the camera module according to the fifth embodiment of the present invention.

FIG. 10 is a plan view showing an upper spring included in an elastic body of a camera module according to a sixth embodiment of the present invention.

FIG. 11 is a plan view showing an upper spring included in an elastic body of a camera module according to a seventh embodiment of the present invention.

FIG. 12 is a sectional view showing the configuration of a camera module according to an eighth embodiment of the present invention.

[FIG. 13] FIG. 13A is a plan view showing a coil section of the camera module according to the eighth embodiment of the present invention, FIG. 13B is a sectional view taken in the arrow direction of line 13A-13A in FIG. 13A, and FIG. 13C is a sectional view taken in the arrow direction of line 13B-13B in FIG. 13A.

[FIG. 14] FIG. 14A is a plan view showing another example of the coil section of the camera module according to the eighth embodiment of the present invention, FIG. 14B is a sectional view taken in the arrow direction of line 14A-14A in FIG. 14A, and FIG. 14C is a sectional view taken in the arrow direction of line 14B-14B in FIG. 14A.

FIG. 15 shows the configuration of a camera module according to a ninth embodiment of the present invention (FIG. 15A is a plan view showing the configuration of this camera module, FIG. 15C is a bottom view showing the configuration of the camera module (a substrate is not shown), and FIG. 15B is a sectional view taken in the arrow direction of line 15A-15A in FIGS. 15A and 15C).

FIG. 16 is an exploded perspective view showing the positional relationship between an upper spring and a lower spring of a camera module according to a tenth embodiment of the present invention.

FIG. 17 is a plan view showing the upper spring included in an elastic body of the camera module according to the tenth embodiment of the present invention.

[FIG. 18]

FIG. 19 is a plan view showing still another example of the upper spring included in the elastic body of the camera module according to the tenth embodiment of the present invention.

[FIG. 20]

FIG. 21 is a sectional view showing the configuration of a conventional camera module having an automatic focus-adjusting system.

DESCRIPTION OF THE INVENTION

Figure 1A:
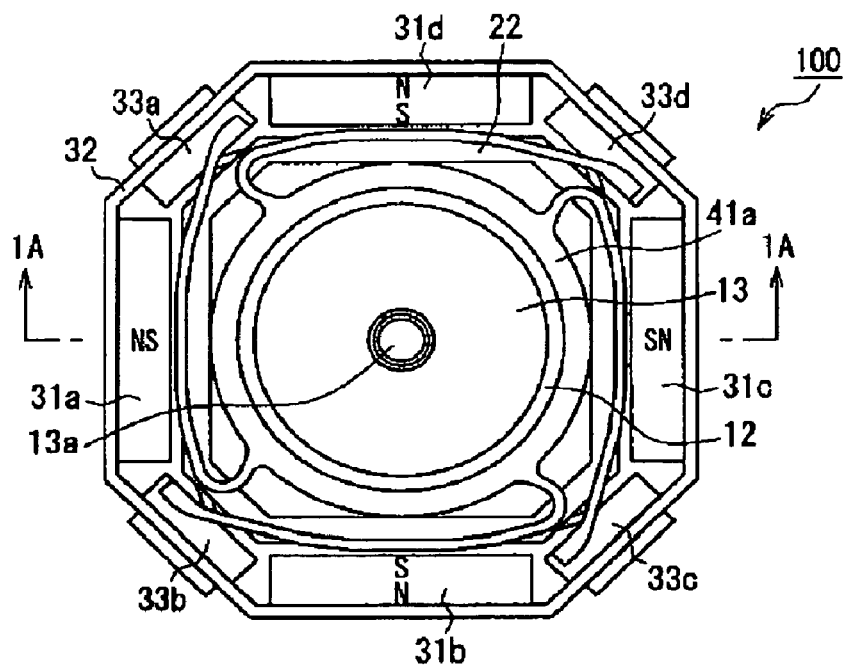
[FIG. 1]

In the configuration of the camera module of the present invention, it is preferable that the elastic body is arranged between an object-side end portion and an end portion on a side opposite to the object-side end portion of the plurality of magnets as a whole.

Also, in the configuration of the camera module of the present invention, it is preferable that the elastic body supports the movable section and the fixed section elastically with a plurality of arms, each having at least one bent portion. In this preferable example, the higher-order resonance frequency of the lens module on a plane perpendicular to the optical axis of the lens can be made high (i.e., the rigidity of the movable section can be improved). Thus, when the movable section including the lens is moved in the optical axis direction of the lens for automatic focusing control, the occurrence of the tilt of the lens itself and the occurrence of misalignment of optical axes between the lens and the imaging element can be reduced remarkably. Therefore, a good optical image is formed on the imaging element at all times, so that it becomes possible to provide a camera module that can achieve an excellent image quality.

In this case, it is preferable that the bent portion forms an angle in the range from 120° to 150°.

In this case, it is preferable that each of the arms has a movable section-supporting end portion for supporting the movable section, a fixed section-supporting end portion for supporting the fixed section, and an arm portion for connecting the movable section-supporting end portion and the fixed section-supporting end portion, and each of the arm portions has the bent portions arranged so as to be symmetrical between adjacent ones of the fixed section-supporting end portions on a plane perpendicular to the optical axis of the lens. According to this preferable example, the bent portions of the arm portion assume a regular shape that can achieve proper balance between the fixed section-supporting end portion and the fixed section-supporting end portion adjacent thereto, so that the stability of the movable section is improved.

In this case, it is preferable that each of the arms has a plurality of bent portions, and the plurality of bent portions are arranged so that they form the same angle and lengths between adjacent ones of the bent portions are the same. According to this preferable example, it is possible to alleviate local stress concentration that occurs in the arm when the movable section including the lens is moved in the optical axis direction of the lens for automatic focusing control. As a result, the durability of the arm can be improved, so that it becomes possible to provide a high-reliability camera module that can increase the number of times the automatic focusing control is performed remarkably.

In this case, it is preferable that each of the arms has a movable section-supporting end portion for supporting the movable section, and the movable section-supporting end portion branches into at least two parts. According to this preferable example, it is possible to increase supported portions on the movable section side without increasing the number of arms. This allows the occurrence of the tilt of the movable section including the lens to be suppressed remarkably.

In this case, it is preferable that the elastic body further includes an annular portion fixed firmly to the movable section, each of the arms is connected to the annular portion via the movable section-supporting end portion, and the annular portion has a plurality of cut-away portions between adjacent ones of the movable section-supporting end portions. According to this preferable example, when the elastic body and the coil are connected electrically to each other by means causing thermal stress, such as soldering, deformation of the elastic body by heat can be concentrated in a region between the cut-away portions by performing the soldering or the like between the cut-away portion. As a result, deformation of the elastic body by heat, which occurs when connecting the elastic body and the coil electrically, can be reduced remarkably, so that it becomes possible to provide a high-reliability camera module in which the occurrence of the optical axis misalignment, tilt, or the like caused by the assembling process can be suppressed.

Furthermore, in the above-described configuration of the camera module of the present invention, it is preferable that the coil is wound around an outer periphery of the movable section so as to face the plurality of magnets, and a winding start position and a winding finish position of the coil are on the same axis that is substantially parallel to the optical axis of the lens between adjacent ones of the magnets along the arrangement direction of the magnets.

Furthermore, in the above-described configuration of the camera module of the present invention, it is preferable that the coil includes N coils (N is an even number) wound in the same direction around an outer periphery of the movable section so as to face the plurality of magnets, a winding start position and a winding finish position of each of the N coils are positioned with a phase shift of 180° between adjacent ones of the magnets along the arrangement direction of the magnets, and the N coils have a plurality of pairs of coils whose winding start positions are positioned with a phase shift of 180°.

In these preferable examples, because the coils have the same number of turns in the magnet-facing portions where the coils face the magnets, Lorentz forces generated in the magnet-facing portions by causing a current to flow through the coils can be balanced properly. As a result, the occurrence of an undesired tilt of the movable section including the lens at the time of automatic focusing control can be suppressed.

Hereinafter, the present invention will be described specifically by way of illustrative embodiments with reference to the accompanying drawings.

First Embodiment

Figure 1B:
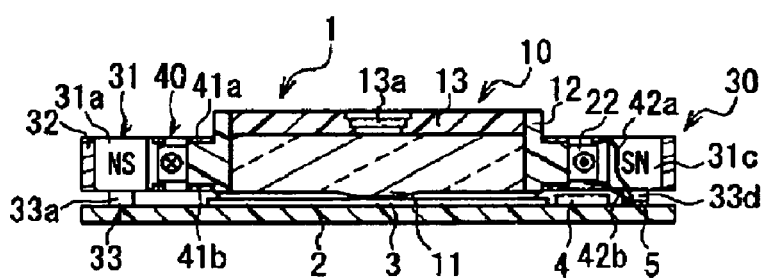
Figure 1C:
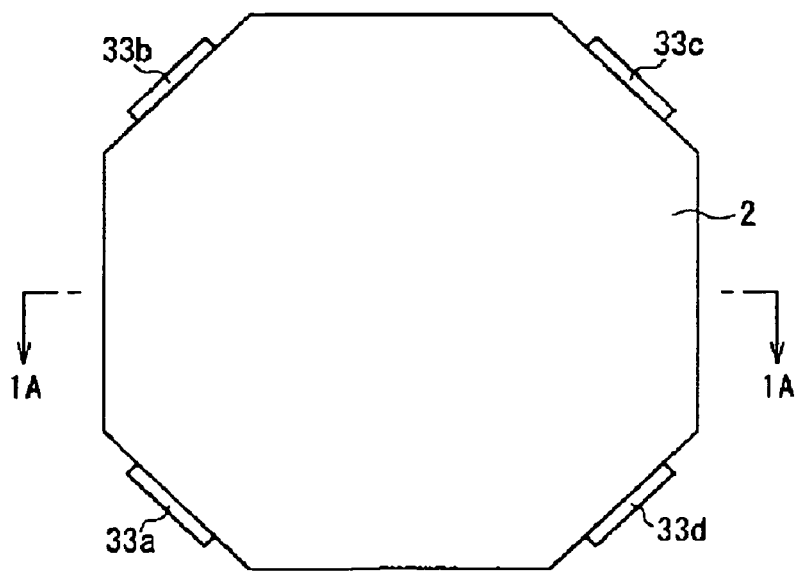

First, a camera module according to a first embodiment of the present invention will be described with reference to the drawings. FIG. 1 shows the configuration of the camera module according to the present embodiment. FIG. 1A is a plan view showing the configuration of the camera module according to the present embodiment, and FIG. 1C is a bottom view showing the configuration of this camera module. FIG. 1B is a sectional view taken in the arrow direction of line 1A-1A in FIGS. 1A and 1C.

As shown in FIGS. 1A to 1C, a camera module 100 of the present embodiment has a lens module 1, a substrate 2, an imaging element 3, an arithmetic element 4, and a driving element 5. The lens module 1 has a movable section 10, a fixed section 30, and an elastic body 40 that elastically supports the movable section 10 and the fixed section 30.

The movable section 10 has a lens 11, a lens holder 12, a lens hood 13, and a coil section 22. Note here that the lens 11 has a function of bending light, and is formed of a glass, plastic, or the like. The lens holder 12 is formed into a substantially cylindrical shape using a plastic or the like with good workability and good heat resistance, and the lens 11 is fixed to the inner wall of this lens holder 12 by press-fitting or the like. The lens hood 13 is formed into a disk shape also using a plastic or the like with good workability and good heat resistance, and this lens hood 13 is fixed to the inner wall of the lens holder 12 by press-fitting or the like. On the outer peripheral surface of the lens holder 12, a stepped portion is provided for firmly fixing annular portions 150 of an upper spring 41a and a lower spring 41b that will be described later. In the center of the lens hood 13, a hole 13a for allowing passage of incident light from an object is formed on the optical axis of the lens 11. That is, the optical axis of the lens 11 coincides with the center of the hole 13a. The hole 13a is processed so that its diameter is tapered stepwise toward the center of the lens 11, when the lens hood 13 is viewed in the plan view of FIG. 1A. The lens hood 13 may be formed integrally with the lens holder 12. The coil section 22 is composed of at least one coil wound around the outer periphery of the lens holder 12. The coil(s) is wound so as to achieve regular winding using a self-welding wire or the like.

The fixed section 30 has a permanent magnet portion 31, a yoke 32, and a support base section 33 and has a hollow space extending in the optical axis direction of the lens 11 so as to allow the movement of the movable section 10 in the optical axis direction of the lens 11. Furthermore, between an inner surface of the permanent magnet portion 31 and an outer surface of the coil section 22, a minute gap is provided so as to allow the movable section 10 to be moved in the optical axis direction of the lens 11. The permanent magnet portion 31 includes four permanent magnets 31a, 31b, 31c, and 31d arranged such that a magnetic flux is generated toward the coil section 22.

As the permanent magnets 31a, 31b, 31c, and 31d, it is possible to use neodymium sintered magnets etc. These permanent magnets 31a, 31b, 31c, and 31d are magnetized so that the movable section 10 side (the inner side) thereof becomes an S pole and the fixed section 30 side (the outer side) thereof becomes an N pole. It is desirable that the permanent magnets 31a, 31b, 31c, and 31d included in the permanent magnet portion 31 have a plate-like shape in order to achieve cost reduction. It is to be noted that the shape of the permanent magnets is not limited to a rectangular shape and can be any shape such as an arc shape. The coil included in the coil section 22 is wound so as to fit the arrangement shape of the permanent magnets 31a, 31b, 31c, and 31d. The cross sectional shape of the coil section 22 shown in FIG. 1B is such that the length thereof in the optical axis direction of the lens 11 (the winding thickness) is longer than the length thereof in the direction perpendicular to the optical axis direction of the lens 11 (the winding width). When the coil section 22 has such a cross sectional shape, it is possible to obtain a magnetic force from the permanent magnet portion 31 efficiently.

The yoke 32 is formed of a ferromagnetic material, such as iron, whose surfaces have been plated. To the inner surface of this yoke 32, the permanent magnets 31a, 31b, 31c, and 31d included in the permanent magnet portion 31 are fixed firmly.

The support base section 33 includes four support bases 33a, 33b, 33c, and 33d formed of a plastic or the like with good workability and good heat resistance. The support bases 33a, 33b, 33c, and 33d are arranged between respective pairs of adjacent ones of the four permanent magnets 31a, 31b, 31c, and 31d, which are fixed firmly to the inner side of the yoke 32, along the arrangement direction of the permanent magnets 31a, 31b, 31c, and 31d. That is, the support bases 33a, 33b, 33c, and 33d are arranged between the permanent magnet 31a and the permanent magnet 31b, between the permanent magnet 31b and the permanent magnet 31c, between the permanent magnet 31c and the permanent magnet 31d, and between the permanent magnet 31d and the permanent magnet 31a, respectively, where they connect the substrate 2 and the yoke 32. That is, bottom faces of the support bases 33a, 33b, 33c, and 33d are fixed firmly to the substrate 2, and upper surfaces of the support bases 33a, 33b, 33c, and 33d are fixed firmly to the yoke 32. Note here that the support bases 33a, 33b, 33c, and 33d may be formed integrally with each other.

The elastic body 40 has an upper spring 41a and a lower spring 41b. The upper spring 41a and the lower spring 41b are formed of a metal that has high electrical conductivity and is highly resistant to metal fatigue, e.g., beryllium copper, and can be obtained by etching or punching out a plate-like member. The shape and the configuration of the upper spring 41a and the lower spring 41b will be described later.

The camera module 100 of the present embodiment is provided with an upper wire 42a and a lower wire 42b. The upper wire 42a is formed of a wire or a metal film pattern, and one end thereof is connected electrically to the fixed section 30 side (the outer side) of the upper spring 41a while the other end thereof is connected electrically to the driving element 5. Similarly, the lower wire 42b is formed of a wire or a metal film pattern, and one end thereof is connected electrically to the fixed section 30 side (the outer side) of the lower spring 41b while the other end thereof is connected electrically to the driving element 5. Although not shown in the drawings, the movable section 10 side (the inner side) of the upper spring 41a is connected electrically to one end of the coil of the coil section 22, and the movable section 10 side (the inner side) of the lower spring 41b is connected electrically to the other end of the coil of the coil section 22. That is, the upper wire 42a is connected electrically to one end of the coil of the coil section 22 via the upper spring 41a, and the lower wire 42b is connected electrically to the other end of the coil of the coil section 22 via the lower spring 41b.

The substrate 2 is formed using an epoxy resin or the like.

The imaging element 3 is composed of a CCD (Charge Coupled Device), CMOS (Complementary Metal-Oxide Semiconductor), or the like, and is arranged on the upper surface of the substrate 2 so as to face the lens 11. Note here that the center of the imaging element 3 coincides with the center of the lens 11. The imaging element 3 is arranged such that the light-receiving surface thereof is perpendicular to the optical axis of the lens 11. When light from an object enters the camera module 100, the incident light is converged by the lens hood 13 and reaches the imaging element 3 via the lens 11, whereby an image is formed on the imaging element 3. The imaging element 3 photoelectrically converts this optical signal into an electric signal, which then is output from the imaging element 3.

The arithmetic element 4 is arranged beside the imaging element 3 on the upper surface of the substrate 2 and is connected electrically to the imaging element 3. The arithmetic element 4 is composed of a DSP (Digital Signal Processor), a RISC (Reduced Instruction Set Computer) microcomputer, or the like, and electric signals from the imaging element 3 are input thereto and subjected to image processing etc.

The driving element 5 is arranged beside the arithmetic element 4 on the upper surface of the substrate 2 and is connected electrically to the arithmetic element 4. The driving element 5 is connected electrically to the upper wire 42a and the lower wire 42b and includes a MOS-FET (metal oxide semiconductor field-effect transistor) or the like. Based on an instruction generated in the arithmetic element 4, the driving element 5 applies a voltage between the upper wire 42a and the lower wire 42b, thus supplying electric power to the coil of the coil section 22.

Although not shown in the drawings, on the upper surface of the substrate 2, a metal wiring pattern is formed to provide an arithmetic power line, a communication line, and a driving power line. The arithmetic power line is connected electrically to the imaging element 3 and the arithmetic element 4, thus allowing electric power to be supplied to the imaging element 3 and the arithmetic element 4. The communication line is connected electrically to the arithmetic element 4, thus allowing information to be exchanged between the arithmetic element 4 and an external device. The driving power line is connected electrically to the driving element 5, thus allowing electric power to be supplied to the driving element 5.

The imaging element 3 provides a small output voltage and thus is susceptible to the influence of noise. On the other hand, the driving element 5 causes a high level of noise because a current and a voltage vary widely in the driving element 5 due to PWM (Pulse Width Modulation) switching or the like. Thus, the arithmetic and communication power lines are separated from the driving power line as described above so as to reduce the influence of the noise. It is to be noted here that, in the case where the imaging element 3, the arithmetic element 4, and the driving element 5 are mounted on a single chip, it is possible to reduce the influence of the noise caused mainly by the driving element 5 by arranging a power supply system including a block serving as the imaging element 3 and a block serving as the driving element 5 so as to be separate from a block serving as the arithmetic element 4. With this configuration, the camera module 100 can form good images.

Hereinafter, automatic focusing control of the camera module 100 configured as above will be described.

A voltage is applied between the upper wire 42a and the lower wire 42b such that the potential of the upper wire 42a becomes higher than the potential of the lower wire 42b, thereby causing a current to flow through the coil of the coil section 22. Here, the wiring is such that the current flows clockwise when the coil section 22 is viewed in the plan view of FIG. 1A. Furthermore, as shown in FIG. 1, each of the permanent magnets 31a, 31b, 31c, and 31d is magnetized so that the movable section 10 side (the inner side) thereof becomes an S pole and the fixed section 30 side (the outer side) thereof becomes an N pole. Thus, due to the interaction (Lorentz force) between the magnetic fluxes caused by the respective permanent magnets 31a, 31b, 31c, and 31d and the current flowing through the coil of the coil section 22, an upward force is applied to the coil section 22 in FIG. 1B. The movable section 10 moves upward in FIG. 1B together with the lens 11 until they reach a position where this upward force balances the force (Hooke's force) caused by the deformation of the upper spring 41a and the lower spring 41b of the elastic body 40, whereby the distance between the lens 11 and the imaging element 3 increases.

The amount by which the movable section 10 including the lens 11 moves substantially is proportional to the Lorentz force, the Lorentz force is proportional to the current flowing through the coil of the coil section 22, and the current flowing through the coil of the coil section 22 is proportional to the voltage applied between the upper wire 42a and the lower wire 42b. Therefore, by controlling the voltage applied between the upper wire 42a and the lower wire 42b by the driving element 5 using the arithmetic element 4, it is possible to control the relative position of the lens 11 with respect to the imaging element 3.

As described above, incident light from an object is converged by the lens hood 13, and reaches the imaging element 3 via the lens 11, whereby an image is formed on the imaging element 3. At this time, if the distance between the lens 11 and the imaging element 3 (the relative position of the lens 11 with respect to the imaging element 3) is proper, the image is in focus, resulting in a clear optical image on the imaging element 3. The imaging element 3 photoelectrically converts this optical signal into an electric signal, which then is output from the imaging element 3. The electric signal output from the imaging element 3 then is input to the arithmetic element 4. Based on this signal, the arithmetic element 4 determines that the image obtained is clear and maintains the voltage instruction to the driving element 5. Thus, the voltage applied between the upper wire 42a and the lower wire 42b is maintained, so that the distance between the lens 11 and the imaging element 3 is maintained.

On the other hand, the image is out of focus if the distance between the lens 11 and the imaging element 3 is not proper, resulting in an unclear optical image on the imaging element 3. The imaging element 3 photoelectrically converts this optical signal into an electric signal, which then is output from the imaging element 3. The electric signal output from the imaging element 3 then is input to the arithmetic element 4. Based on the input signal, the arithmetic element 4 determines that the image obtained is unclear and changes the voltage instruction to the driving element 5. Thus, the voltage applied between the upper wire 42a and the lower wire 42b is changed, so that the distance between the lens 11 and the imaging element 3 is changed. This operation is repeated until the distance between the lens 11 and the imaging element 3 becomes proper. In this manner, the camera module 100 performs automatic focusing control.

Figure 2A:
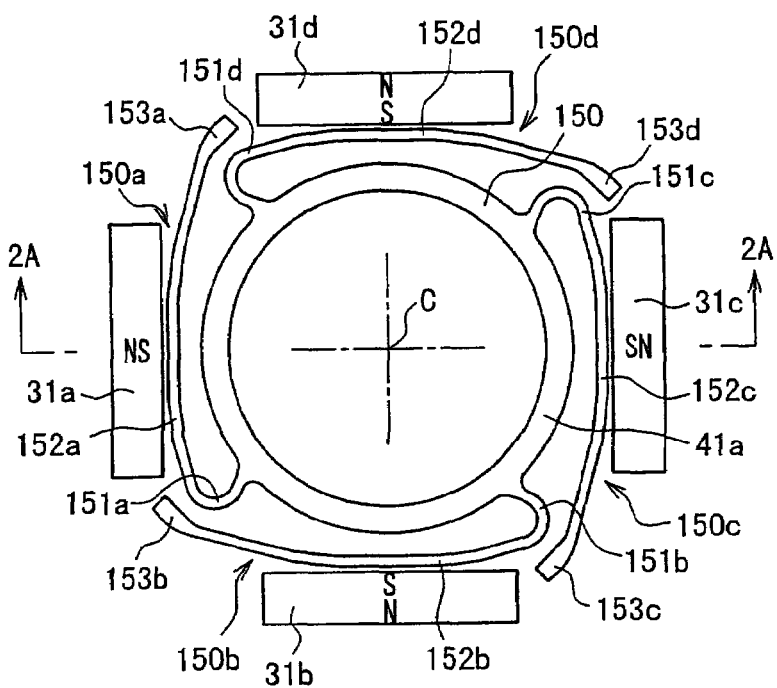
[FIG. 2] FIG. 2 schematically shows the layout of the camera module according to the first embodiment of the present invention (FIG. 2A is a plan view showing the positional relationship between the permanent magnet portion and the elastic body in this camera module, FIG. 2C is a bottom view showing the positional relationship between the permanent magnet portion and the elastic body in this camera module, FIG. 2B is a sectional view taken in the arrow direction of line 2A-2A in FIGS. 2A and 2C).
Figure 2B:
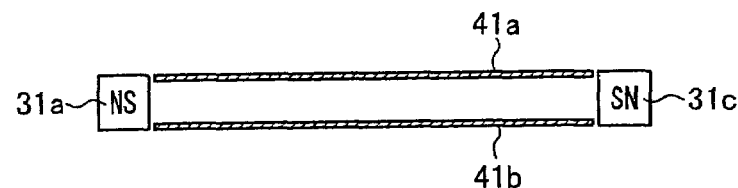
Figure 2C:
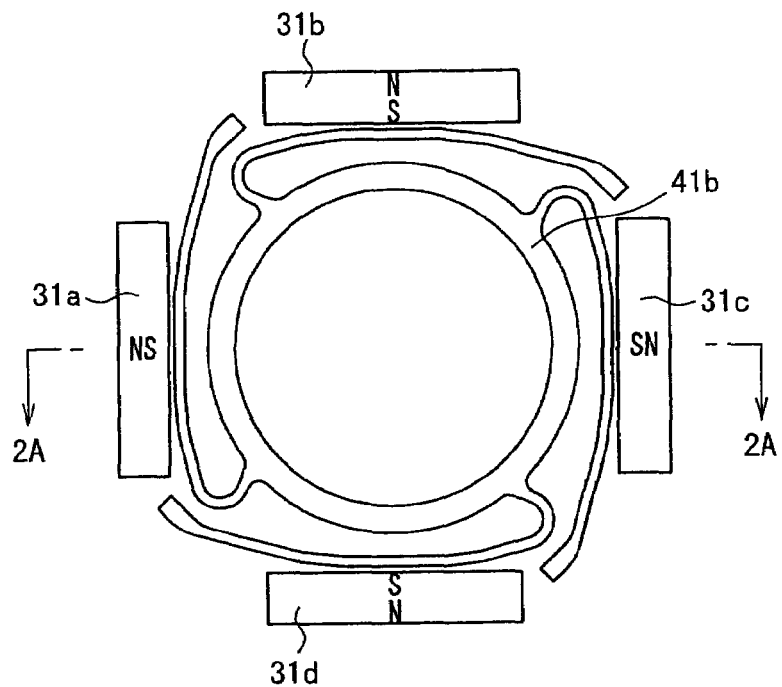
Figure 3:
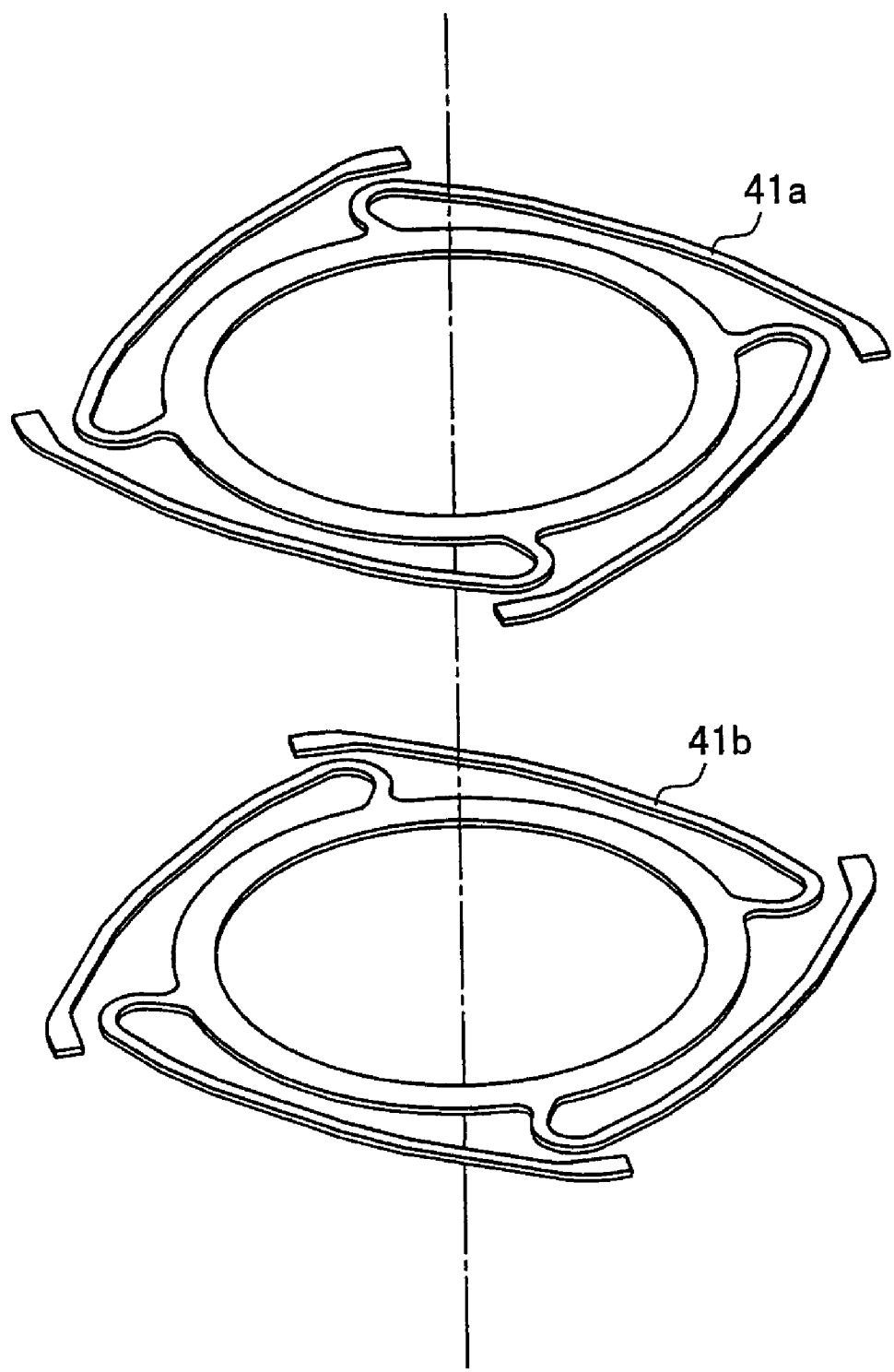
[FIG. 3]

Next, the lens module according to the present embodiment will be described in further detail. FIG. 2 schematically shows the layout of the camera module according to the present embodiment. For the sake of clarity, FIG. 2 only shows, as the components of the lens module, the permanent magnets 31a, 31b, 31c, and 31d included in the permanent magnet portion 31 and the upper spring 41a and the lower spring 41b included in the elastic body 40. FIG. 2A is a plan view showing the positional relationship between the permanent magnet portion and the elastic body in this camera module of the present embodiment, FIG. 2C is a bottom view showing the positional relationship between the permanent magnet portion and the elastic body in this camera module. FIG. 2B is a sectional view taken in the arrow direction of line 2A-2A in FIGS. 2A and 2C. FIG. 3 shows the positional relationship between the upper spring and the lower spring in the camera module of the present embodiment.

First, with reference to FIG. 2, the positional relationship between the permanent magnet portion and the elastic body in the lens module will be described.

As shown in FIGS. 2A and 2B, the upper spring 41a includes the annular portion 150 on the movable section 10 (see FIG. 1B) side (the inner side) and four arms 150a, 150b, 150c, and 150d. The annular portion 150 is fixed firmly to the lens holder 12 (see FIG. 1). The four arms 150a, 150b, 150c, and 150d respectively include movable section-supporting end portions 151a, 151b, 151c, and 151d for supporting the movable section 10, fixed section-supporting end portions 153a, 153b, 153c, and 153d for supporting the fixed section 30 (see FIG. 1B), and arm portions 152a, 152b, 152c, and 152d for connecting the movable section-supporting end portions 151a, 151b, 151c, and 151d to the fixed section-supporting end portions 153a, 153b, 153c, and 153d, respectively. The annular portion 150 is connected to the arm portions 152a, 152b, 152c, and 152d via the movable section-supporting end portions 151a, 151b, 151c, and 151d, respectively, and the fixed section-supporting end portions 153a, 153b, 153c, and 153d are connected to the arm portions 152a, 152b, 152c, and 152d, respectively. The four arms 150a, 150b, 150c, and 150d exhibit 90° rotational symmetry about the center C of the movable section 10 (the center of the upper spring 41a).

The fixed section-supporting end portions 153a, 153b, 153c, and 153d of the upper spring 41a are arranged between respective pairs of adjacent ones of the four permanent magnets 31a, 31b, 31c, and 31d arranged along the inner side of the yoke 32 on the same plane perpendicular to the optical axis of the lens 11, i.e., between the permanent magnet 31a and the permanent magnet 31b, between the permanent magnet 31b and the permanent magnet 31c, between the permanent magnet 31c and the permanent magnet 31d, and between the permanent magnet 31d and the permanent magnet 31a, respectively. The fixed section-supporting end portions 153a, 153b, 153c, and 153d are fixed firmly to the support bases 33a, 33b, 33c, and 33d, respectively.

As shown in FIGS. 2A to 2C, the lower spring 41b has the same shape and configuration as the upper spring 41a. Therefore, the detailed description thereof has been omitted.

As shown in FIG. 3, the lower spring 41b is shaped and positioned such that, if the upper spring 41a were to be moved parallel to the optical axis direction of the lens 11 until it reached the location for the lower spring 41b and then were inverted 180° with respect to an axis that is perpendicular to the optical axis of the lens 11, the lower spring 41b would be seen.

As described above, the movable section 10 and the fixed section 30 are supported by the upper spring 41a and the lower spring 41b, with the fixed section-supporting end portions of the upper spring 41a and the lower spring 41b being positioned between respective pairs of adjacent ones of the four permanent magnets 31a, 31b, 31c, and 31d arranged along the inner side of the yoke 32 on the same plane perpendicular to the optical axis of the lens 11 to provide spaces between these fixed section-supporting end portions and the permanent magnet portion 31. Thus, the necessity of considering the insulation between the permanent magnet portion 31 and the upper spring 41a or the lower spring 41b is eliminated. Therefore, it is possible to eliminate the necessity of providing an insulator or the like as required conventionally when arranging the upper spring 41a and the lower spring 41b on the upper and lower surfaces of the permanent magnet portion 31. With this configuration, it becomes possible to provide a camera module having an automatic focusing control function at low cost.

Furthermore, the above configuration is such that the positions of the upper spring 41a and the lower spring 41b in the optical axis direction of the lens 11 do not depend on the thickness of the permanent magnet portion 31 etc. Thus, by setting the positions of the upper spring 41*a* and the lower spring 41*b* in the optical axis direction of the lens 11 within the thickness of the permanent magnet portion 31, it becomes possible to provide a camera module with an automatic focusing control function whose thickness has been reduced remarkably.

Moreover, it is possible to suppress the occurrence of the tilt of the movable section 10 including the lens 11 by arranging the lower spring 41*b* such that, if the upper spring 41*a* were inverted 180° with respect to an axis that is perpendicular to the optical axis of the lens 11, the lower spring 41*b* would be seen. As a result, a good optical image is formed on the imaging element 3 at all times, so that it becomes possible to provide a camera module that can achieve an excellent image quality.

Although four permanent magnets are provided in the present embodiment, the number of the permanent magnets is not limited thereto. It is to be noted, however, in order to allow countermeasures to the tilt to be taken easily at the time of mass production, it is desirable to use an even number of permanent magnets arranged so as to form one or more pairs of facing permanent magnets.

Moreover, although the magnets used in the present embodiment are permanent magnets, it also is possible to use electromagnets.

Second Embodiment

Next, a camera module according to a second embodiment of the present invention will be described with reference to the drawings. The camera module of the present embodiment has the same configuration as the camera module of the first embodiment except for an upper spring and a lower spring included in an elastic body. Furthermore, the lower spring has the same configuration as the upper spring. Thus, in the present embodiment, only the upper spring will be described in detail.

Figure 4:
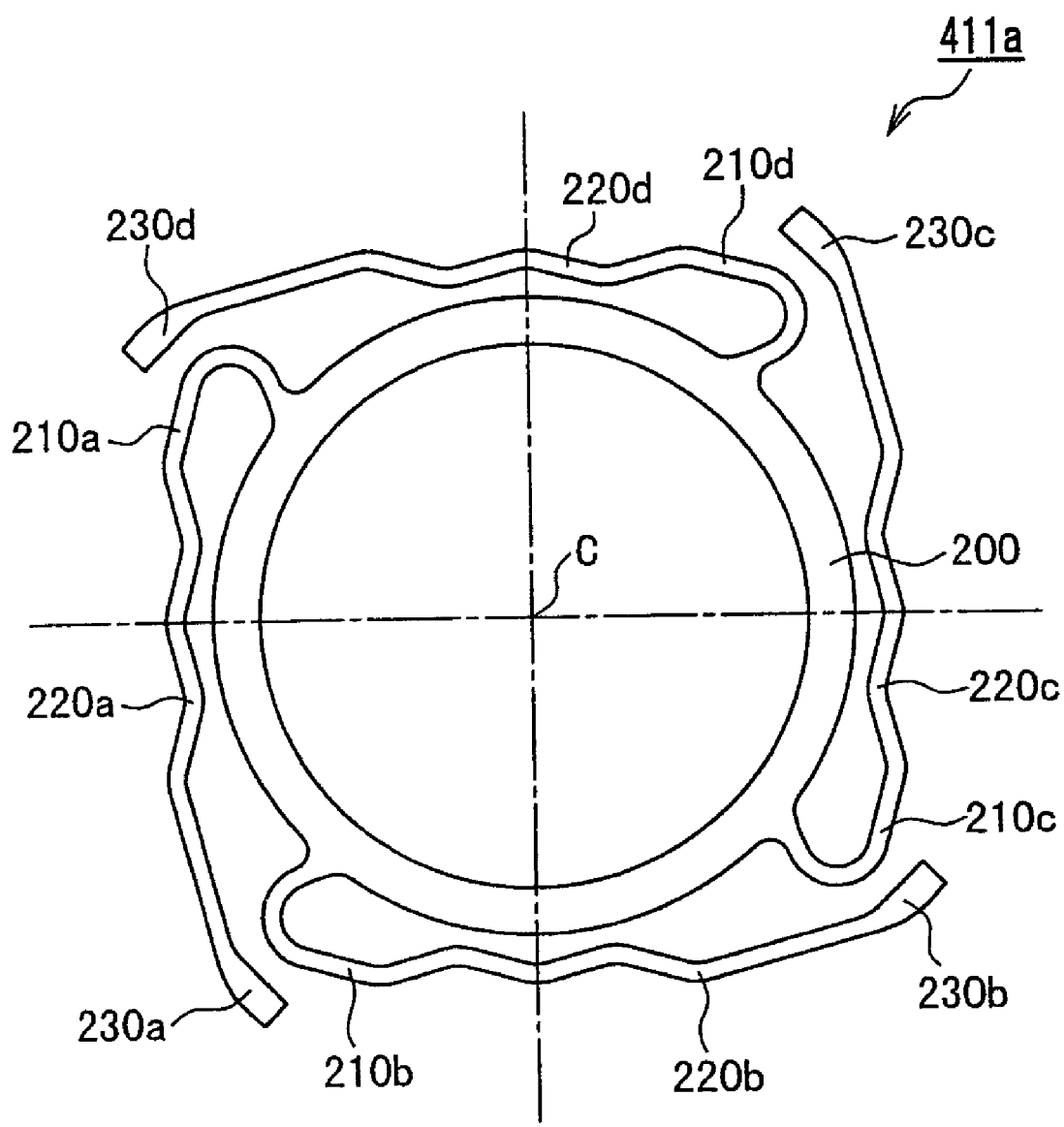
[FIG. 4]

FIG. 4 shows the upper spring included in the elastic body of the camera module of the present embodiment.

As shown in FIG. 4, an upper spring 411*a* of the present embodiment includes an annular portion 200 on the movable section 10 (see FIG. 1B) side (the inner side), movable section-supporting end portions 210*a*, 210*b*, 210*c*, and 210*d*, fixed section-supporting end portions 230*a*, 230*b*, 230*c*, and 230*d*, and arm portions 220*a*, 220*b*, 220*c*, and 220*d* for connecting the movable section-supporting end portions 210*a*, 210*b*, 210*c*, and 210*d* and the fixed section-supporting end portion 230*a*, 230*b*, 230*c*, and 230*d*. The annular portion 200 is connected to the arm portions 220*a*, 220*b*, 220*c*, and 220*d* via the movable section-supporting end portions 210*a*, 210*b*, 210*c*, and 210*d*, respectively, and the fixed section-supporting end portions 230*a*, 230*b*, 230*c*, and 230*d* are connected to the arm portions 220*a*, 220*b*, 220*c*, and 220*d*, respectively. Each of the arm portions 220*a*, 220*b*, 220*c*, and 220*d* has five bent portions that are bent in a plane perpendicular to the optical axis of the lens 11 (see FIG. 1B). Four arms, each including the movable section-supporting end portion 210*a* (210*b*, 210*c*, 210*d*), the fixed section-supporting end portion 230*a* (230*b*, 230*c*, 230*d*), and the arm portion 220*a* (220*b*, 220*c*, 220*d*), exhibit 90° rotational symmetry about the center C of the movable section 10 (the center of the upper spring 411*a*).

According to the camera module configured so as to include the upper spring and the lower spring having the above-described shapes, the higher-order resonance frequency of the lens module on a plane perpendicular to the optical axis of the lens 11 can be made high (i.e., the rigidity of the movable section 10 can be improved). Thus, when the movable section 10 including the lens 11 is moved in the optical axis direction of the lens 11 for automatic focusing control, the occurrence of the tilt of the lens 11 itself and the occurrence of misalignment of optical axes between the lens 11 and the imaging element 3 (see FIG. 1B) can be reduced remarkably. Furthermore, on a plane perpendicular to the optical axis of the lens 11, the length of the arms of the upper spring and the lower spring can be extended, so that the rigidity of the arms of the upper spring and the lower spring in the optical axis direction of the lens 11 can be decreased. Since this alleviates the Hooke's force applied in the optical axis direction of the lens 11, it becomes possible to reduce an electric power required to move the movable section 10. Therefore, a good optical image is formed on the imaging element 3 at all times, so that it becomes possible to provide a high-efficiency camera module that can achieve an excellent image quality.

Desirably, each bent portion of each arm portion of the upper spring and the lower spring form an angle in the range from 120° to 150°. By setting the angle formed by the bent portion in this range, it is possible to obtain the above-described effect while suppressing the stress applied to the bent portion to some extent.

Figure 5:
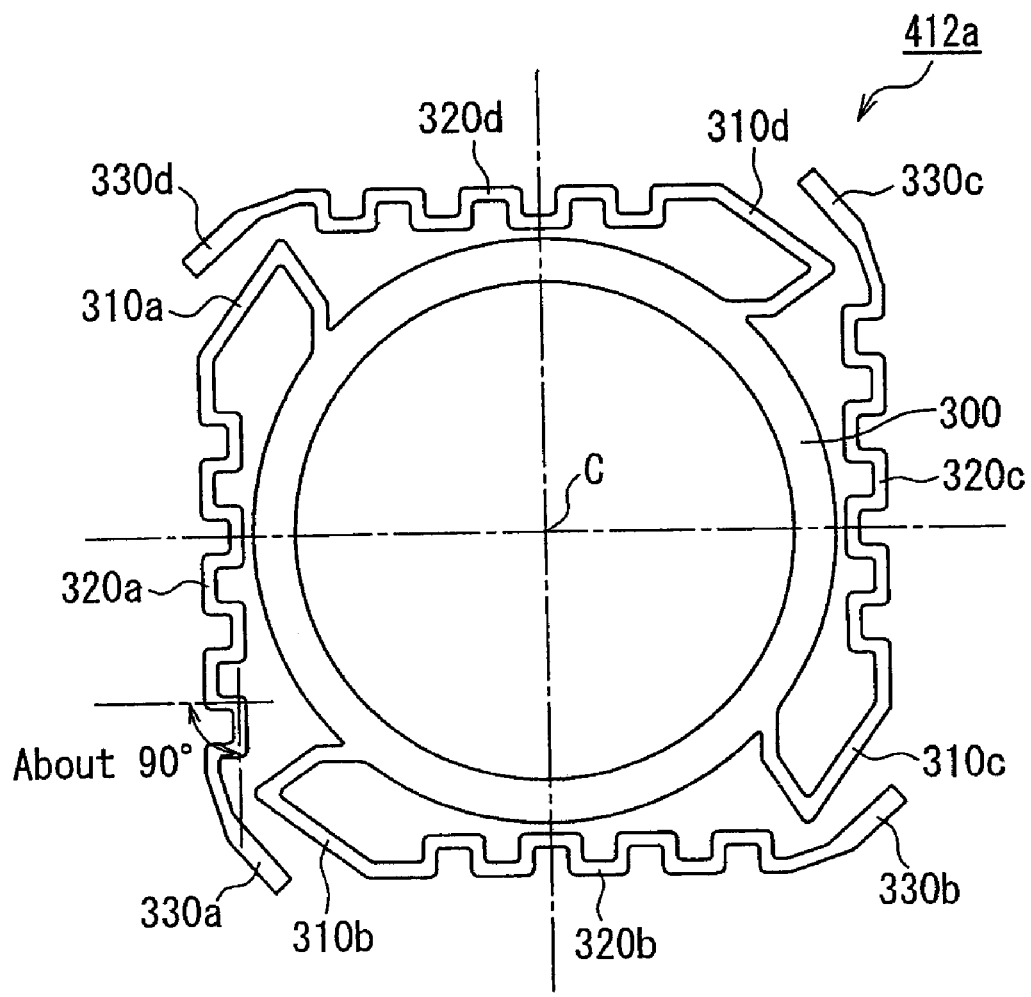
[FIG. 5]

FIG. 5 shows another example of the upper spring included in the elastic body of the camera module of the present embodiment. Note here that the lower spring has the same configuration as the upper spring.

As shown in FIG. 5, this upper spring 412*a* includes an annular portion 300 on the movable section 10 side (the inner side), movable section-supporting end portions 310*a*, 310*b*, 310*c*, and 310*d*, fixed section-supporting end portions 330*a*, 330*b*, 330*c*, and 330*d*, and arm portions 320*a*, 320*b*, 320*c*, and 320*d* for connecting the movable section-supporting end portions 310*a*, 310*b*, 310*c*, and 310*d* and the fixed section-supporting end portion 330*a*, 330*b*, 330*c*, and 330*d*. The annular portion 300 is connected to the arm portions 320*a*, 320*b*, 320*c*, and 320*d* via the movable section-supporting end portions 310*a*, 310*b*, 310*c*, and 310*d*, respectively, and the fixed section-supporting end portions 330*a*, 330*b*, 330*c*, and 330*d* are connected to the arm portions 320*a*, 320*b*, 320*c*, and 320*d*, respectively. Four arms each including the movable section-supporting end portion 310*a* (310*b*, 310*c*, 310*d*), the fixed section-supporting end portion 330*a* (330*b*, 330*c*, 330*d*), and the arm portion 320*a* (320*b*, 320*c*, 320*d*), exhibit 90° rotational symmetry about the center C of the movable section 10 (the center of the upper spring 412*a*).

Each of the arm portions 320*a*, 320*b*, 320*c*, and 320*d* has sixteen bent portions, each of which is bent so as to form an angle of about 90° in a plane perpendicular to the optical axis of the lens 11. With this configuration, the effect equivalent to that described above also can be obtained.

Third Embodiment

Next, a camera module according to a third embodiment of the present invention will be described with reference to the drawings. The camera module of the present embodiment has the same configuration as the camera module of the first embodiment except for an upper spring and a lower spring included in an elastic body. Furthermore, the lower spring has the same configuration as the upper spring. Thus, in the present embodiment, only the upper spring will be described in detail.

Figure 6:
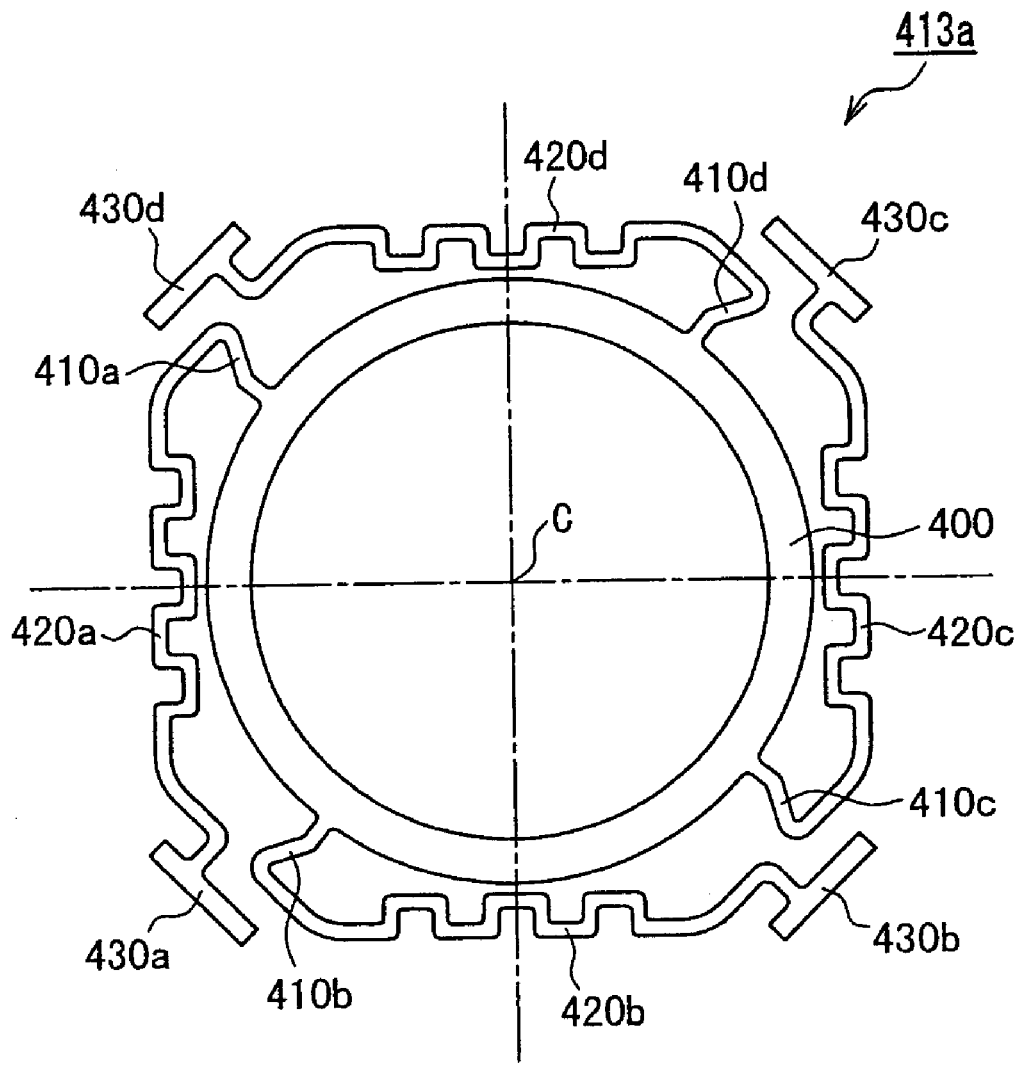
[FIG. 6]

FIG. 6 shows the upper spring included in the elastic body of the camera module of the present embodiment.

As shown in FIG. 6, an upper spring 413a of the present embodiment includes an annular portion 400 on the movable section 10 (see FIG. 1B) side (the inner side), movable section-supporting end portions 410a, 410b, 410c, and 410d, fixed section-supporting end portions 430a, 430b, 430c, and 430d, and arm portions 420a, 420b, 420c, and 420d for connecting the movable section-supporting end portions 410a, 410b, 410c, and 410d and the fixed section-supporting end portion 430a, 430b, 430c, and 430d. The annular portion 400 is connected to the arm portions 420a, 420b, 420c, and 420d via the movable section-supporting end portions 410a, 410b, 410c, and 410d, respectively, and the fixed section-supporting end portions 430a, 430b, 430c, and 430d are connected to the arm portions 420a, 420b, 420c, and 420d, respectively. Four arms, each including the movable section-supporting end portion 410a (410b, 410c, 410d), the fixed section-supporting end portion 430a (430b, 430c, 430d), and the arm portion 420a (420b, 420c, 420d), exhibit 90° rotational symmetry about the center C of the movable section 10 (the center of the upper spring 413a).

Each of the arm portions 420a, 420b, 420c, and 420d has fourteen bent portions that are bent in a plane perpendicular to the optical axis of the lens 11 (see FIG. 1B). The fourteen bent portions are arranged so as to be bilaterally-symmetrical between the fixed section-supporting end portion (e.g., reference numeral 430d) and the fixed section-supporting end portion adjacent thereto (e.g., reference numeral 430c).

According to the camera module configured so as to include the upper spring and the lower spring having the above-described shapes, the bent portions of the arm portion have shapes such that they are bent regularly to attain a proper balance between the fixed section-supporting end portion and the fixed section-supporting end portion adjacent thereto, so that the stability of the movable section 10 is improved. Thus, when the movable section 10 including the lens 11 is moved in the optical axis direction of the lens 11 for automatic focusing control, the occurrence of misalignment of optical axes between the lens 11 and the imaging element 3 (see FIG. 1B) and the occurrence of the tilt can be suppressed remarkably.

Since the effect brought about by providing the bent portions in the arm portions already has been described in the second embodiment, the description thereof has been omitted here.

Therefore, with the configuration of the present embodiment, a good optical image is formed on the imaging element 3 at all times, so that it becomes possible to provide a high-efficiency camera module that can achieve an excellent image quality.

Fourth Embodiment

Next, a camera module according to a fourth embodiment of the present invention will be described with reference to the drawings. The camera module of the present embodiment has the same configuration as the camera module of the first embodiment except for an upper spring and a lower spring included in an elastic body. Furthermore, the lower spring has the same configuration as the upper spring. Thus, in the present embodiment, only the upper spring will be described in detail.

Figure 7:
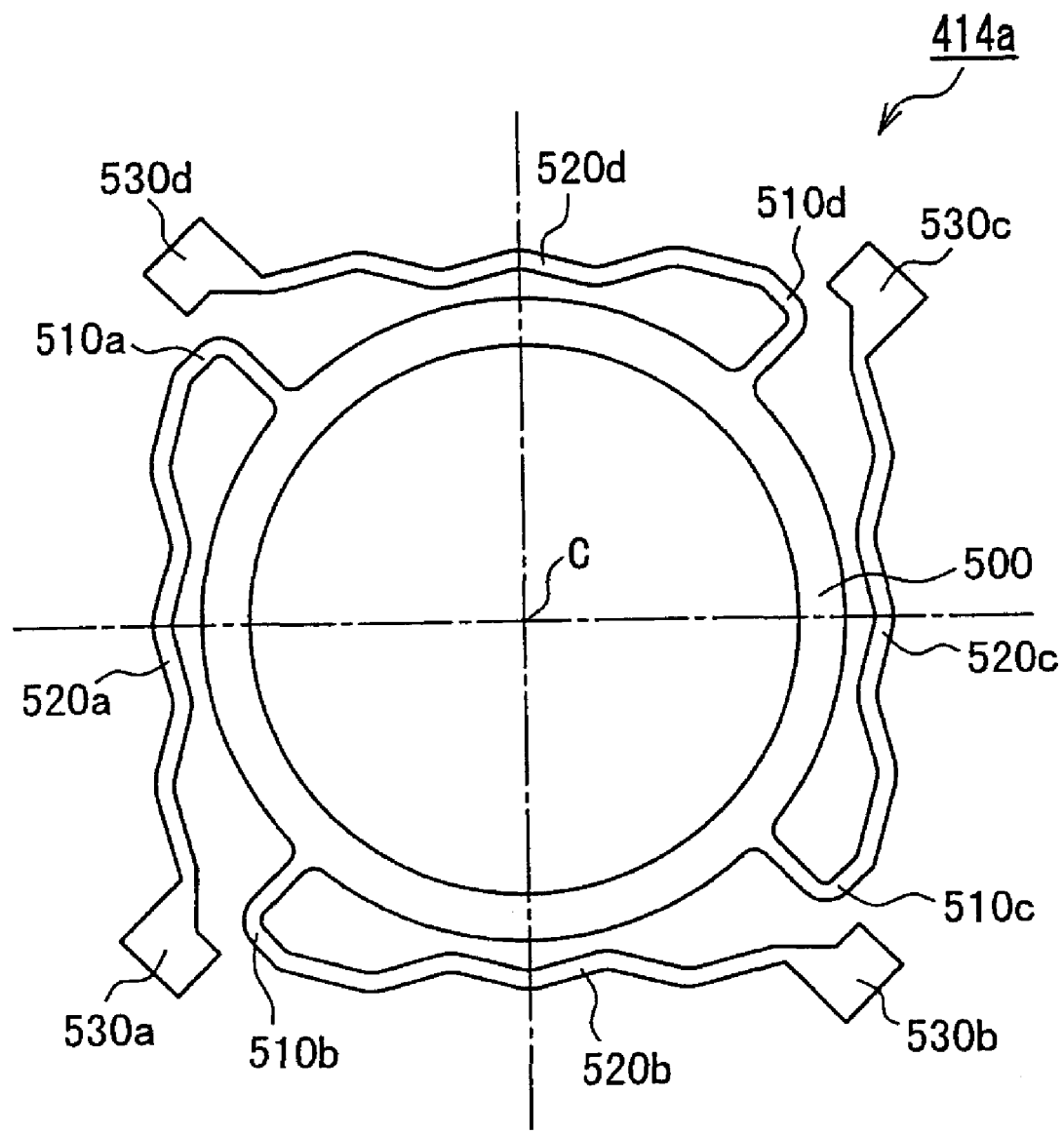
[FIG. 7]

FIG. 7 shows the upper spring included in the elastic body of the camera module of the present embodiment.

As shown in FIG. 7, an upper spring 414a of the present embodiment includes an annular portion 500 on the movable section 10 (see FIG. 1B) side (the inner side), movable section-supporting end portions 510a, 510b, 510c, and 510d, fixed section-supporting end portions 530a, 530b, 530c, and 530d, and arm portions 520a, 520b, 520c, and 520d for connecting the movable section-supporting end portions 510a, 510b, 510c, and 510d and the fixed section-supporting end portion 530a, 530b, 530c, and 530d. The annular portion 500 is connected to the arm portions 520a, 520b, 520c, and 520d via the movable section-supporting end portions 510a, 510b, 510c, and 510d, respectively, and the fixed section-supporting end portions 530a, 530b, 530c, and 530d are connected to the arm portions 520a, 520b, 520c, and 520d, respectively. Four arms, each including the movable section-supporting end portion 510a (510b, 510c, 510d), the fixed section-supporting end portion 530a (530b, 530c, 530d), and the arm portion 520a (520b, 520c, 520d), exhibit 90° rotational symmetry about the center C of the movable section 10 (the center of the upper spring 414a).

Each of the arm portions 520a, 520b, 520c, and 520d has five bent portions that are bent in a plane perpendicular to the optical axis of the lens 11 (see FIG. 1B). The five bent portions are arranged so that they form the same angle and the lengths between adjacent ones of the bent portions are the same.

According to the camera module configured so as to include the upper spring and the lower spring having the above-described shapes, it is possible to alleviate local stress concentration that occurs in the arm portions when the movable section 10 including the lens 11 is moved in the optical axis direction of the lens 11 for automatic focusing control. As a result, the durability of the arm portions can be improved.

Since the effect brought about by providing the bent portions in the arm portions has already been described in the second embodiment, the description thereof has been omitted here.

Therefore, with the configuration of the present embodiment, it becomes possible to provide a high-reliability camera module by which the number of times the automatic focusing control is performed can be increased remarkably.

Fifth Embodiment

Next, a camera module according to a fifth embodiment of the present invention will be described with reference to the drawings. The camera module of the present embodiment has the same configuration as the camera module of the first embodiment except for an upper spring and a lower spring included in an elastic body. Furthermore, the lower spring has the same configuration as the upper spring. Thus, in the present embodiment, only the upper spring will be described in detail.

Figure 8A:
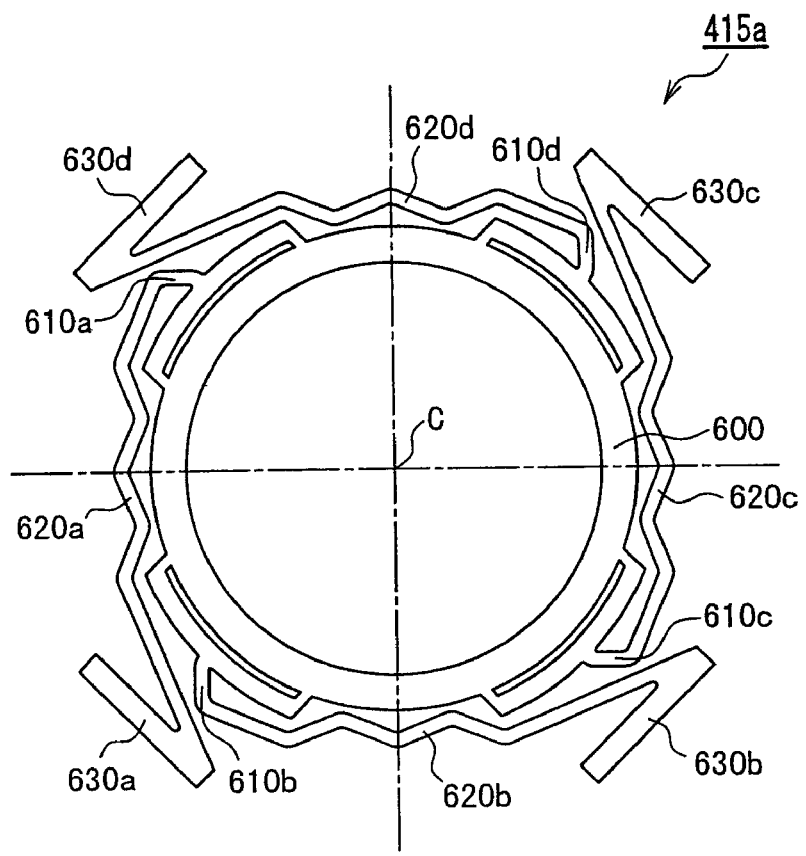
FIG. 8A is a plan view showing an upper spring included in an elastic body of a camera module according to a fifth embodiment of the present invention.
Figure 8B:
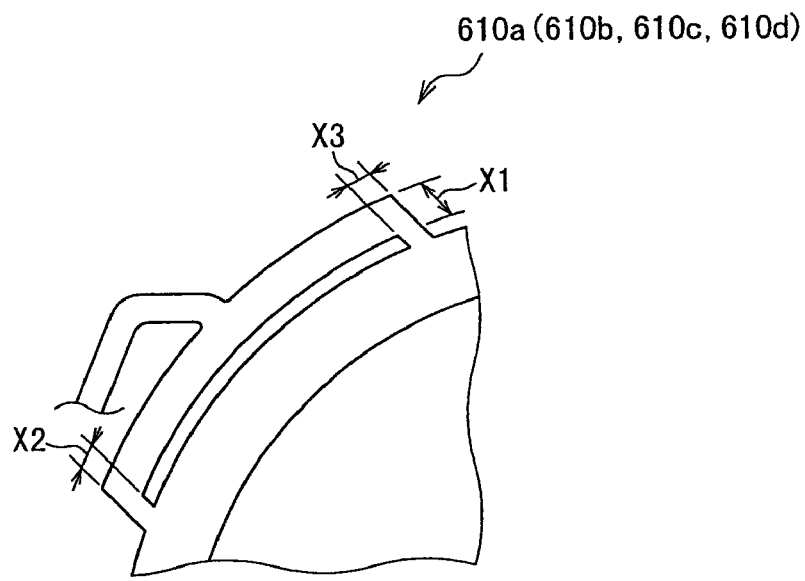
FIG. 8B is an enlarged view of a movable section-supporting end portion of this upper spring.

FIG. 8 shows the upper spring included in the elastic body of the camera module of the present embodiment. FIG. 8A is a plan view showing the upper spring used in the present embodiment, and FIG. 8B is an enlarged view of a movable section-supporting end portion of the upper spring.

As shown in FIG. 8A, an upper spring 415a of the present embodiment includes an annular portion 600 on the movable section 10 (see FIG. 1B) side (the inner side), movable section-supporting end portions 610a, 610b, 610c, and 610d, fixed section-supporting end portions 630a, 630b, 630c, and 630d, and arm portions 620a, 620b, 620c, and 620d for connecting the movable section-supporting end portions 610a, 610b, 610c, and 610d and the fixed section-supporting end portion 630a, 630b, 630c, and 630d. The annular portion 600 is connected to the arm portions 620a, 620b, 620c, and 620d via the movable section-supporting end portions 610a, 610b, 610c, and 610d, respectively, and the fixed section-supporting end portions 630a, 630b, 630c, and 630d are connected to the arm portions 620a, 620b, 620c, and 620d, respectively. Each of the arm portions 620a, 620b, 620c, and 620d has five bent portions that are bent in a plane perpendicular to the optical axis of the lens 11 (see FIG. 1B). Four arms, each including the movable section-supporting end portion 610a (610b, 610c, 610d), the fixed section-supporting end portion 630a (630b, 630c, 630d), and the arm portion 620a (620b, 620c, 620d), exhibit 90° rotational symmetry about the center C of the movable section 10 (the center of the upper spring 415a).

As shown in FIGS. 8A and 8B, each of the movable section-supporting end portions 610a, 610b, 610c, and 610d branches into two parts.

According to the camera module configured so as to include the upper spring and the lower spring having the above-described shapes, it is possible to increase the supported portion on the movable section 10 side without increasing the number of arms. This suppresses the occurrence of the tilt of the movable section 10 including the lens 11 remarkably.

Since the effect brought about by providing the bent portions in the arm portions already has been described in the second embodiment, the description thereof has been omitted here.

Therefore, with the configuration of the present embodiment, a good optical image is formed on the imaging element 3 (see FIG. 1B) at all times, so that it becomes possible to provide a high-efficiency camera module that can achieve an excellent image quality.

Moreover, as shown in FIG. 8B, by expanding the widths X1, X2, and X3 of the branched parts of the movable section-supporting end portion 610a, 610b, 610c, and 610d, the effect of suppressing the occurrence of the tilt of the movable section 10 including the lens 11 can be improved.

Although the above description is directed to the case where the movable section-supporting end portion branches into two parts, an effect similar to that described above can be obtained when the movable section-supporting end portion branches into three or more parts.

Figure 9:
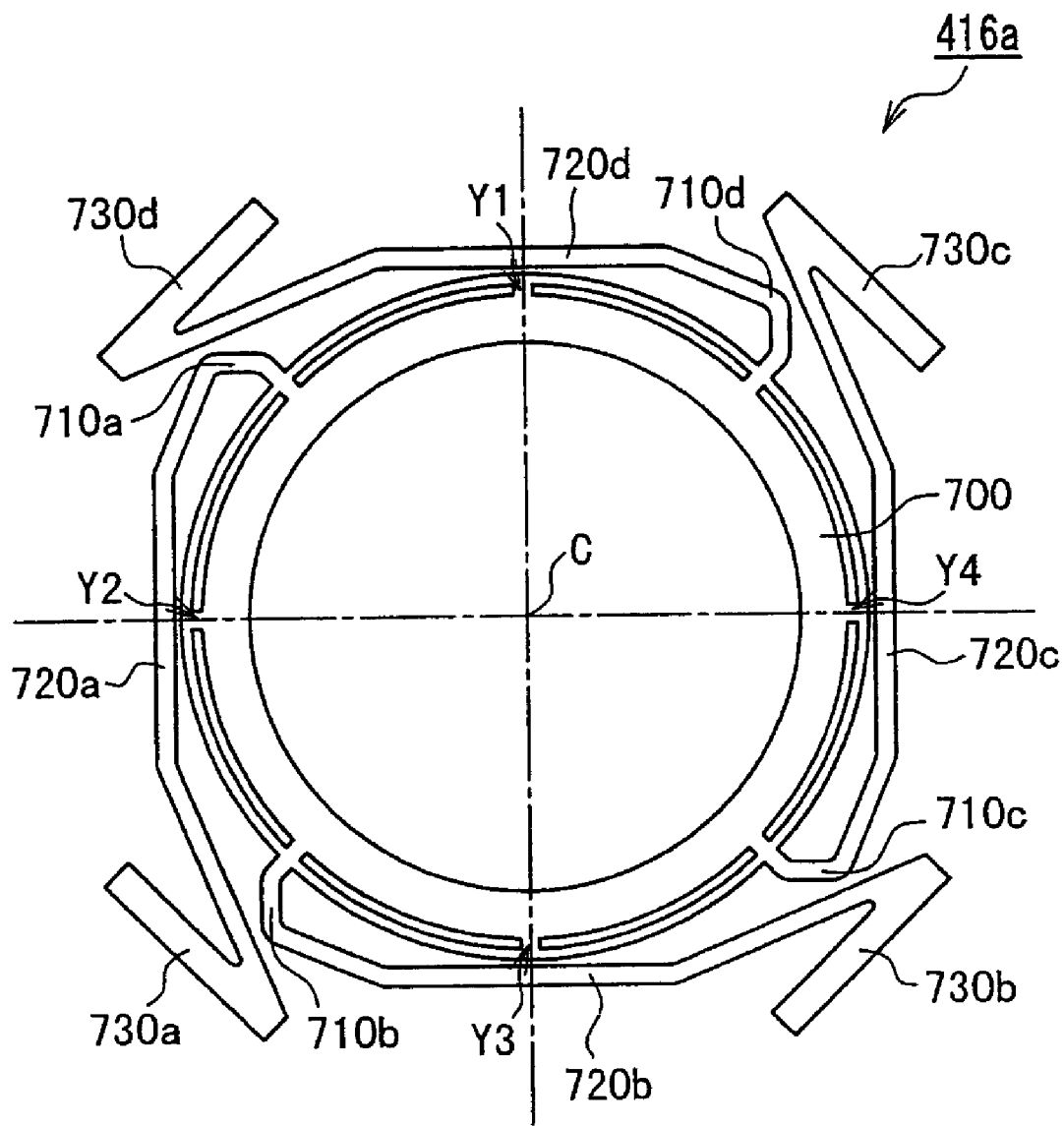
[FIG. 9]

FIG. 9 shows another example of the upper spring included in the elastic body of the camera module of the present embodiment. Note here that the lower spring has the same configuration as the upper spring.

As shown in FIG. 9, this upper spring 416a of the present embodiment includes an annular portion 700 on the movable section 10 side (the inner side), movable section-supporting end portions 710a, 710b, 710c, and 710d, fixed section-supporting end portions 730a, 730b, 730c, and 730d, and arm portions 720a, 720b, 720c, and 720d for connecting the movable section-supporting end portions 710a, 710b, 710c, and 710d and the fixed section-supporting end portion 730a, 730b, 730c, and 730d. The annular portion 700 is connected to the arm portions 720a, 720b, 720c, and 720d via the movable section-supporting end portions 710a, 710b, 710c, and 710d, respectively, and the fixed section-supporting end portions 730a, 730b, 730c, and 730d are connected to the arm portions 720a, 720b, 720c, and 720d, respectively. Each of the arm portions 720a, 720b, 720c, and 720d has two bent portions that are bent in a plane perpendicular to the optical axis of the lens 11. Four arms, each including the movable section-supporting end portion 710a (710b, 710c, 710d), the fixed section-supporting end portion 730a (730b, 730c, 730d), and the arm portion 720a (720b, 720c, 720d), exhibit 90° rotational symmetry about the center C of the movable section 10 (the center of the upper spring 416a).

In the present embodiment, each of the movable section-supporting end portions 710a, 710b, 710c, and 710d branches into three parts. In this case, the branched part of the movable section-supporting end portion (e.g., reference numeral 710a) is shared by the branched part of the movable section-supporting end portion (e.g., reference numeral 710d) adjacent thereto with a portion indicated with Y1 (Y2, Y3, Y4) being their boundary.

According to the camera module configured so as to include the upper spring and the lower spring having the above-described shapes, an effect similar to that described above can be obtained and also stress concentration to the movable section-supporting end portions 710a, 710b, 710c, and 710d can be alleviated. Accordingly, it is also possible to improve the durability of the movable section-supporting end portions 710a, 710b, 710c, and 710d.

Therefore, with this configuration, a good optical image is formed on the imaging element 3 at all times, so that it becomes possible to provide a high-efficiency and high-reliability camera module that can achieve an excellent image quality.

Sixth Embodiment

Next, a camera module according to a sixth embodiment of the present invention will be described with reference to the drawings. The camera module of the present embodiment has the same configuration as the camera module of the first embodiment except for an upper spring and a lower spring included in an elastic body. Furthermore, the lower spring has the same configuration as the upper spring. Thus, in the present embodiment, only the upper spring will be described in detail.

Figure 10:
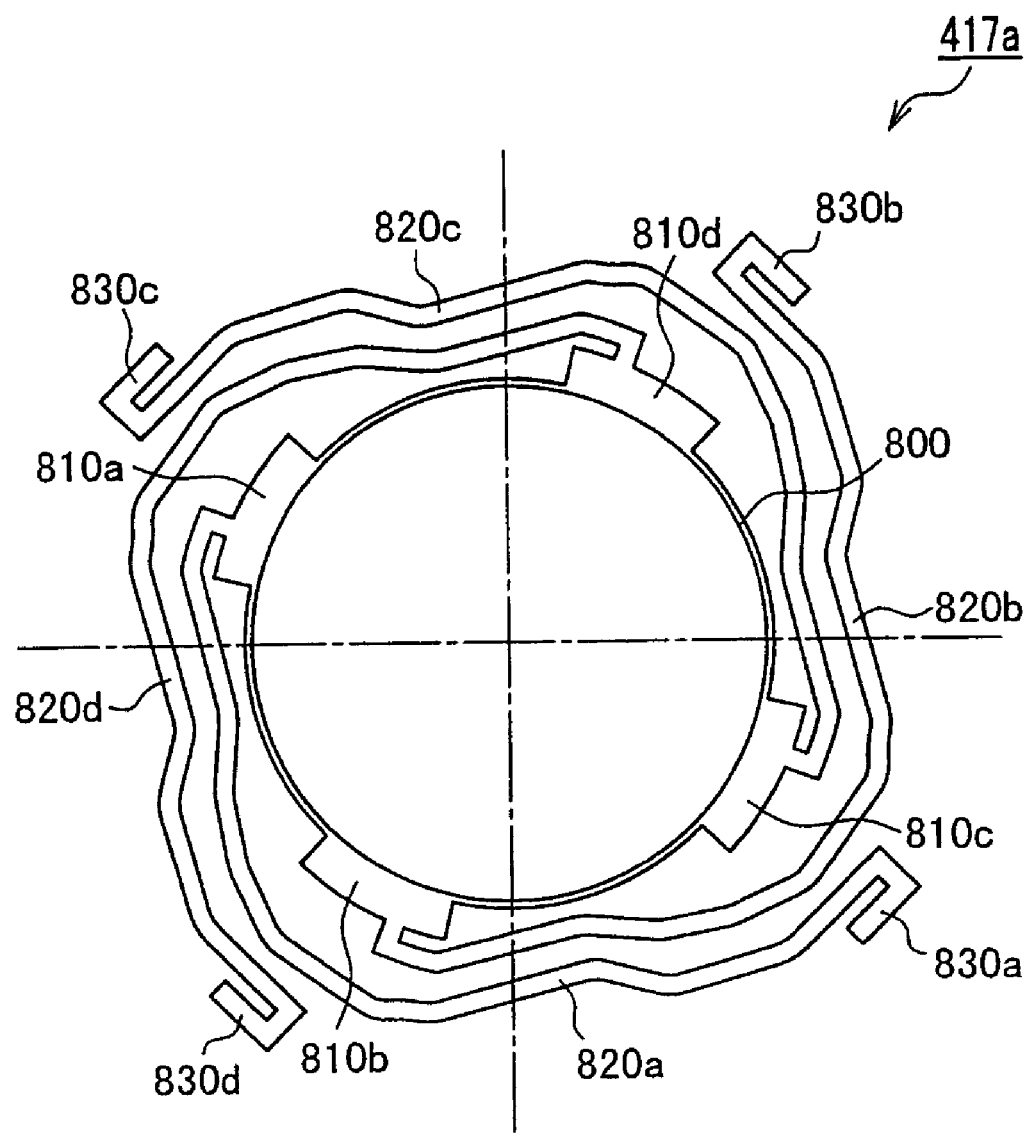
[FIG. 10]

FIG. 10 shows the upper spring included in the elastic body of the camera module of the present embodiment.

As shown in FIG. 10, an upper spring 417a of the present embodiment includes an annular portion 800 on the movable section 10 (see FIG. 1B) side (the inner side), movable section-supporting end portions 810a, 810b, 810c, and 810d, fixed section-supporting end portions 830a, 830b, 830c, and 830d, and arm portions 820a, 820b, 820c, and 820d for connecting the movable section-supporting end portions 810a, 810b, 810c, and 810d and the fixed section-supporting end portion 830a, 830b, 830c, and 830d. The annular portion 800 is connected to the arm portions 820a, 820b, 820c, and 820d via the movable section-supporting end portions 810a, 810b, 810c, and 810d, respectively, and the fixed section-supporting end portions 830a, 830b, 830c, and 830d are connected to the arm portions 820a, 820b, 820c, and 820d, respectively. Each of the arm portions 820a, 820b, 820c, and 820d has a plurality of bent portions that are bent in a plane perpendicular to the optical axis of the lens 11 (see FIG. 1B). Four arms, each including the movable section-supporting end portion 810a (810b, 810c, 810d), the fixed section-supporting end portion 830a (830b, 830c, 830d), and the arm portion 820a (820b, 820c, 820d), exhibit 90° rotational symmetry about the center C of the movable section 10 (the center of the upper spring 417a).

Note here that the annular portion 800 of the upper spring 417a has a narrow width on a plane perpendicular to the optical axis of the lens 11, except for the movable section-supporting end portions 810a, 810b, 810c, and 810d.

According to the camera module configured so as to include the upper spring and the lower spring having the above-described shapes, it is possible to increase an area effective for forming the arms on a plane perpendicular to the optical axis of the lens 11. This allows the arms of the upper spring and the lower spring to be long, thus allowing the upper spring and the lower spring to have a small spring constant (to be soft). In FIG. 10, for example, the fixed section-supporting end portion 830a corresponding to the movable section-supporting end portion 810a is in the vicinity of the movable section-supporting end portion 810c opposing the movable section-supporting end portion 810a, so that the arm portion 820a becomes considerably long.

Since the effect brought about by providing the bent portions in the arm portions has already been described in the second embodiment, the description thereof has been omitted here.

Therefore, with the configuration of the present embodiment, the automatic focusing control operation of the movable section 10 including the lens 11 can be achieved using a low current, so that it becomes possible to provide a camera module in which the power consumption is suppressed.

Seventh Embodiment

Next, a camera module according to a seventh embodiment of the present invention will be described with reference to the drawings. The camera module of the present embodiment has the same configuration as the camera module of the first embodiment except for an upper spring and a lower spring included in an elastic body. Furthermore, the lower spring has the same configuration as the upper spring. Thus, in the present embodiment, only the upper spring will be described in detail.

Figure 11:
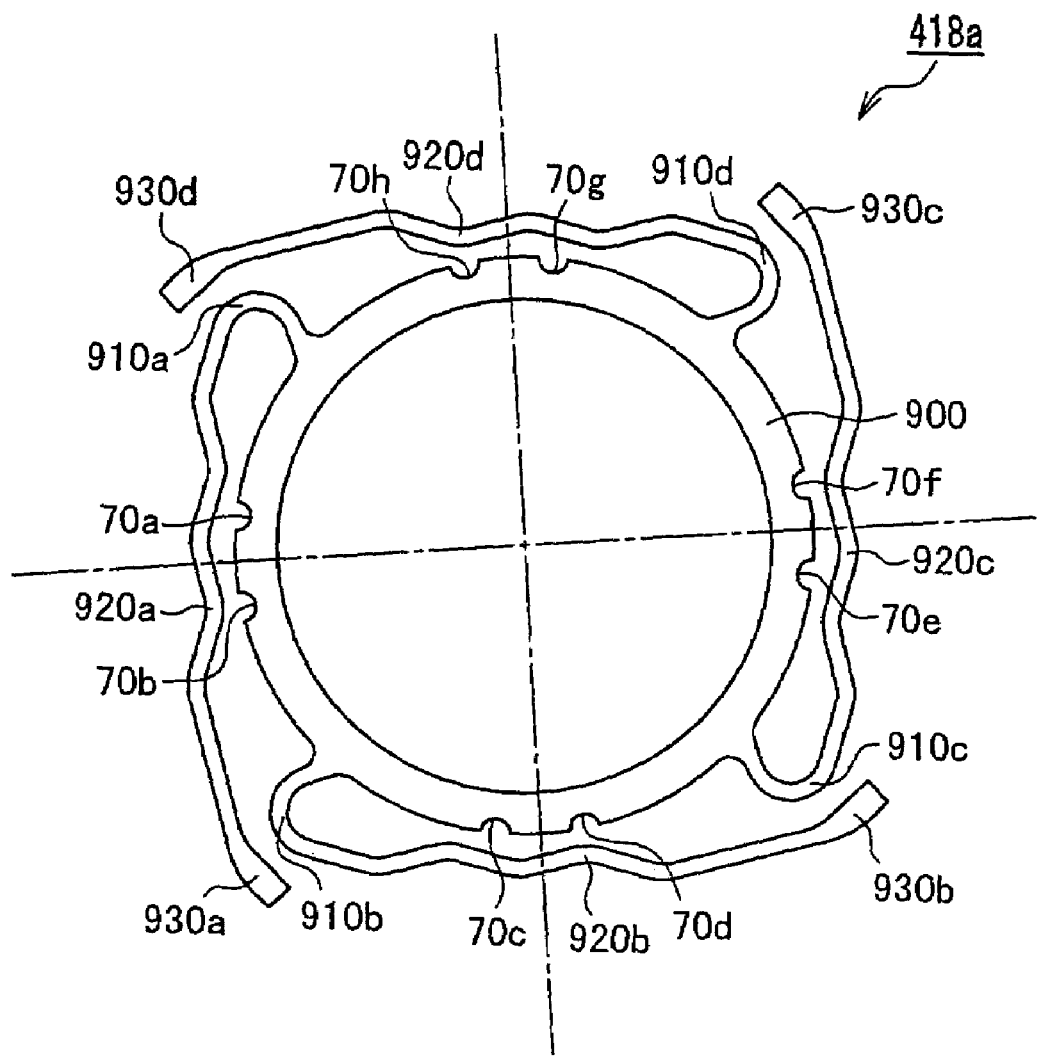
[FIG. 11]

FIG. 11 shows the upper spring included in the elastic body of the camera module according to the present embodiment.

As shown in FIG. 11, an upper spring 418a of the present embodiment includes an annular portion 900 on the movable section 10 (see FIG. 1B) side (the inner side), movable section-supporting end portions 910a, 910b, 910c, and 910d, fixed section-supporting end portions 930a, 930b, 930c, and 930d, and arm portions 920a, 920b, 920c, and 920d for connecting the movable section-supporting end portions 910a, 910b, 910c, and 910d and the fixed section-supporting end portion 930a, 930b, 930c, and 930d. The annular portion 900 is connected to the arm portions 920a, 920b, 920c, and 920d via the movable section-supporting end portions 910a, 910b, 910c, and 910d, respectively, and the fixed section-supporting end portions 930a, 930b, 930c, and 930d are connected to the arm portions 920a, 920b, 920c, and 920d, respectively. Each of the arm portions 920a, 920b, 920c, and 920d has five bent portions that are bent in a plane perpendicular to the optical axis of the lens 11 (see FIG. 1B). Four arms, each including the movable section-supporting end portion 910a (910b, 910c, 910d), the fixed section-supporting end portion 930a (930b, 930c, 930d), and the arm portion 920a (920b, 920c, 920d), exhibit 90° rotational symmetry about the center C of the movable section 10 (the center of the upper spring 418a).

In an outer peripheral portion of the annular portion 900, a pair of cut-away portions are provided so as to be bilaterally-symmetrical with respect to a substantially central portion of each pair of adjacent ones of the movable section-supporting end portions. More specifically, a pair of cut-away portions 70a and 70b are provided between the movable section-supporting end portion 910a and the movable section-supporting end portion 910b, a pair of cut-away portions 70c and 70d are provided between the movable section-supporting end portion 910b and the movable section-supporting end portion 910c, a pair of cut-away portion 70e and 70f are provided between the movable section-supporting end portion 910c and the movable section-supporting end portion 910d, and a pair of cut-away portion 70g and 70h are provided between the movable section-supporting end portion 910d and the movable section-supporting end portion 910a.

According to the camera module configured so as to include the upper spring and the lower spring having the above-described shapes, when the upper spring and the lower spring are connected electrically to the coil of the coil section 22 (see FIG. 1B) by means that causes thermal stress, such as soldering, deformation of the upper spring and the lower spring by heat can be concentrated in a region between the pair of cut-away portions (e.g., between the cut-away portion 70a and the cut-away portion 70b) by setting the connection portion between the upper spring 418a (and the lower spring) and the coil of the coil section 22 to substantially a central portion of each pair of adjacent ones of the movable section-supporting end portions (between each pair of cut-away portions).

Since the effect brought about by providing the bent portions in the arm portions already has been described in the second embodiment, the description thereof has been omitted here.

Therefore, according to the configuration of the present embodiment, deformation caused by the heat of the upper spring and the lower spring, which occurs when connecting the upper spring and the lower spring to the coil of the coil section 22 electrically, can be reduced remarkably. Thus, it becomes possible to provide a high-reliability camera module in which the occurrence of the optical axis misalignment, tilt, or the like due to the assembling process can be suppressed.

Although the present embodiment is directed to an example where a pair of cut-away portions are provided between adjacent ones of the movable section-supporting end portions, the number of the cut-away portions may be three or more.

Furthermore, although the second to seventh embodiments are directed to examples where a plurality of bent portions are provided in each of the arm portions, it is only necessary that each of the arm portions has at least one bent portion.

Eighth Embodiment

Next, a camera module according to an eighth embodiment of the present invention will be described with reference to the drawings.

Figure 12:
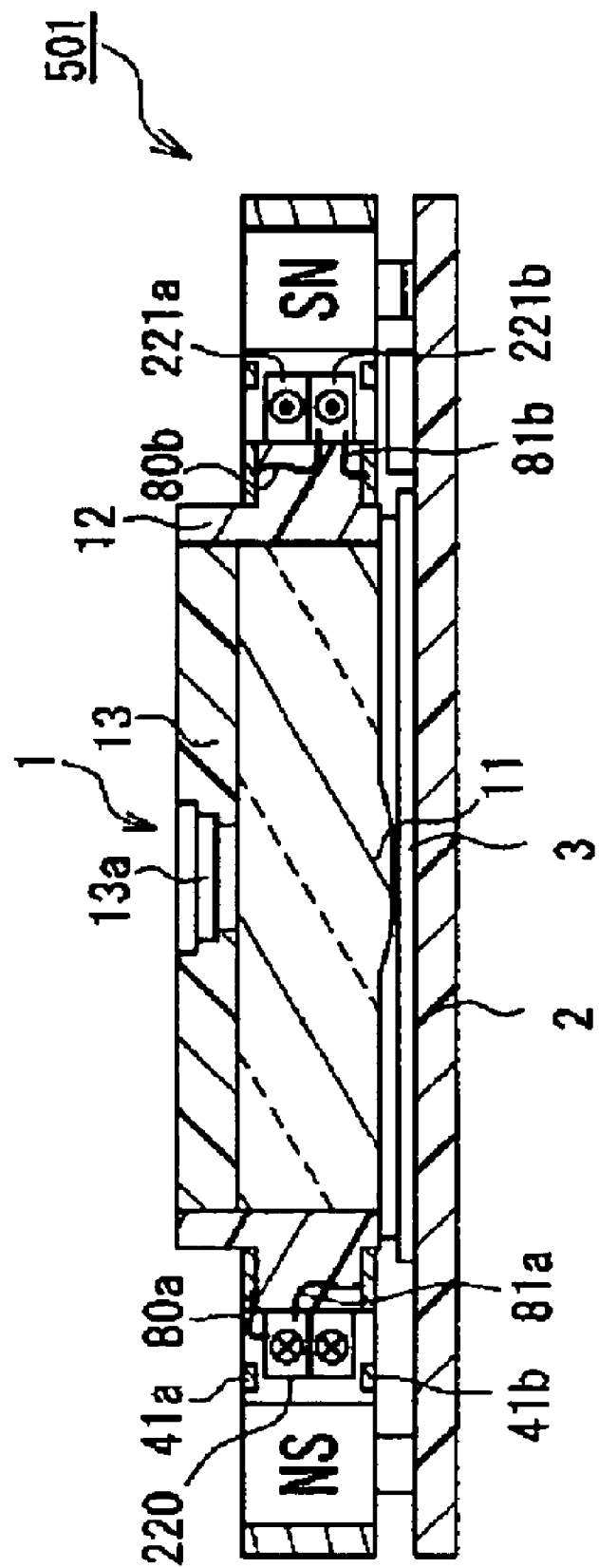
[FIG. 12]

FIG. 12 shows the configuration of the camera module according to the present embodiment.

A camera module 501 of the present embodiment shown in FIG. 12 has the same configuration as the camera module of the first embodiment (FIG. 1), except for a coil section 220. Therefore, components having the same function as those of the camera module of the first embodiment are given the same reference numerals and the description thereof has been omitted. Also, the automatic focusing control operation is performed in the same manner as that in the camera module of the first embodiment, and the description thereof thus has been omitted.

As shown in FIG. 12, in the camera module 501 of the present embodiment, the coil section 220 is arranged such that two coils 221a and 221b are wound around an outer periphery of a lens holder 12 in the state where they are stacked in the optical axis direction of a lens 11 (see FIG. 1B). Each of these coils 221a and 221b is wound so as to achieve regular winding using a self-welding wire or the like. The coils 221a and 221b have completely the same coil specification such as the material, the diameter, and the number of turns, and they are wound in the same direction.

Coil wires 80*a* and 81*a* are winding start and finish portions of the coil 221*a*, respectively. The coil wire 80*a* is connected electrically to an inner annular portion of an upper spring 41*a*, and the coil wire 81*a* is connected electrically to an inner annular portion of a lower spring 41*b*.

Coil wires 80*b* and 81*b* are winding start and finish portions of the coil 221*b*, respectively. The coil wire 80*b* is connected electrically to an inner annular portion of the upper spring 41*a*, and the coil wire 81*b* is connected electrically to an inner annular portion of the lower spring 41*b*.

Hereinafter, the coil section 220 will be described in further detail with reference to FIG. 13. FIG. 13A is a plan view showing the coil section of the camera module according to the present embodiment, FIG. 13B is a sectional view taken in the arrow direction of line 13A-13A in FIG. 13A, and FIG. 13C is a sectional view taken in the arrow direction of line 13B-13B in FIG. 13A.

As shown in FIGS. 13A to 13C, the coils 221*a* and 221*b* are wound around the outer periphery of the lens holder 12 so that they face the permanent magnets 31*a*, 31*b*, 31*c*, and 31*d*. The winding start position (the coil wire 80*a*) and the winding finish position (the coil wire 81*a*) of the coil 221*a*, and the winding start position (the coil wire 80*b*) and the winding finish position (the coil wire 81*b*) of the coil 221*b* are on the same axis that is parallel to the optical axis of the lens 11 on a plane perpendicular to the optical axis of the lens 11, and is arranged between adjacent ones of the permanent magnets 31*a*, 31*b*, 31*c*, and 31*d* along the arrangement direction of these magnets. The winding start position (the coil wire 80*a*) of the coil 221*a* and the winding start position (the coil wire 80*b*) of the coil 221*b* are arranged with a phase shift of 180° about the center of the coil section 220 (the center C of the movable section 10 (see FIG. 1B) on a plane perpendicular to the optical axis of the lens 11.

By setting the winding start positions (the coil wires 80*a* and 80*b*) and the winding finish positions (the coil wire 81*a* and 81*b*) of the coils 221*a* and 221*b* as described above, the coils 221*a* and 221*b* have the same number of turns in the permanent magnet-facing portions 90*a*, 90*b*, 90*c*, and 90*d* where the coils 221*a* and 221*b* face the permanent magnets 31*a*, 31*b*, 31*c*, and 31*d*, as shown in FIGS. 13A, 13B, and 13C. Thus, Lorentz forces generated in the permanent magnet-facing portions 90*a*, 90*b*, 90*c*, and 90*d* by causing a current to flow through the coils 221*a* and 221*b* become symmetrical with respect to the center of the coil section 220 (the center C of the movable section 10) (when viewed in the plan view of FIG. 13A, bilaterally/vertically symmetrical). Therefore, it is possible to suppress the occurrence of an undesired tilt of the movable section 10 including the lens 11 at the time of automatic focusing control.

By arranging the winding start positions or the winding finish positions of the coils 221*a* and 221*b* with a phase shift of 180° about the center of the coil section 220 (the center C of the movable section 10) on a plane perpendicular to the optical axis of the lens 11, undesired imbalance of the center of gravity caused by the process of winding the coils 221*a* and 221*b* or the like can be cancelled out as the coil section 220 as a whole. That is, it becomes possible to bring the center of gravity of the coil section 220 to the center of the coil section 220 (the center C of the movable section 10). As a result, the occurrence of an undesired tilt due to the imbalance of the center of gravity of the movable section 10 can be suppressed.

Therefore, with the configuration of the present embodiment, a good optical image is formed on the imaging element 3 (see FIG. 1B) at all times, so that it becomes possible to provide a camera module that can achieve an excellent image quality.

FIG. 14 shows another example of the coil section of the camera module of the present embodiment (FIG. 14A is a plan view, FIG. 14B is a sectional view taken in the arrow direction of line 14A-14A in FIG. 14A, and FIG. 14C is a sectional view taken in the arrow direction of line 14B-14B in FIG. 14A).

The configuration of a coil section 230 shown in FIG. 14 is different from that of the coil section 220 shown in FIG. 13 in the following respect. That is, as shown in FIG. 14, the coil section 230 is wound around an outer periphery of a lens holder 12 in the state where two coils 222*a* and 222*b* are stacked in the optical axis direction of a lens 11. The winding start position (the coil wire 82*a*) of the coil 222*a* and the winding finish position (the coil wire 83*b*) of the coil 222*b*, and the winding finish position (the coil wire 83*a*) of the coil 222*a* and the winding start position (the coil wire 82*b*) of the coil 222*b* are on the same axis that is parallel to the optical axis of the lens 11 on a plane perpendicular to the optical axis of the lens 11, and is arranged between adjacent ones of the permanent magnets 31*a*, 31*b*, 31*c*, and 31*d* along the arrangement direction of these magnets. The winding start position (the coil wire 82*a*) and the winding finish position (the coil wire 83*a*) of the coil 222*a* are arranged with a phase shift of 180° about the center of the coil section 230 (the center C of the movable section 10) on a plane perpendicular to the optical axis of the lens 11. The winding start position (the coil wire 82*b*) and the winding finish position (the coil wire 83*b*) of the coil 222*b* are arranged with a phase shift of 180° about the center of the coil section 230 (the center C of the movable section 10) on a plane perpendicular to the optical axis of the lens 11. Except for this, the configuration shown in FIG. 14 is the same as that shown in FIGS. 12 and 13.

When the coils 222*a* and 222*b* are configured as above, imbalance occurs between the number of turns of the coil 222*a* and the coil 222*b*, as shown in FIGS. 14B and 14C. Thus, for example, Lorentz forces generated in the permanent magnet-facing portions 91*a*, 91*b*, 91*c*, and 91*d* by causing a current to flow through the coil 222*a* are not symmetrical with respect to the center of the coil section 230 (the center C of the movable section 10), which may lead to an undesired tilt of the movable section 10 including the lens 11 at the time of automatic focusing control. However, the winding start position (the coil wire 82*a*) of the coil 222*a* and the winding finish position (the coil wire 83*b*) of the coil 222*b*, as well as the winding finish position (the coil wire 83*a*) of the coil 222*a* and the winding start position (the coil wire 82*b*) of the coil 222*b*, are on the same side, and the coil 222*a* and the coil 222*b* are wound in the same direction. Thus, when it comes to the coil section 230, an imbalance of the number of turns does not exist. Therefore, it is possible to suppress the occurrence of an undesired tilt of the movable section 10 including the lens 11 at the time of automatic focusing control.

Furthermore, as in the case of the coils 222*a* and 222*b*, by arranging the coil wires 82*a* and 82*b* as the winding start positions and the coil wires 83*a* and 83*b* as the winding finish positions with a phase shift of 180° about the center of the coil section 230 (the center C of the movable section 10) on a plane perpendicular to the optical axis of the lens 11, and arranging both the coil wire 83*a* as the winding finish position of the coil 222*a* and the coil wire 82*b* as the winding start position of the coil 222*b* between the permanent magnet 31*b* and the permanent magnet 31*c*, the distance between the coil wire 83*a* as the winding finish position of the coil 222*a* and the coil wire 82*b* as the winding start position of the coil 222*b* becomes short. Thus, the coil 222*a* and the coil 222*b* can be connected in series easily, thus increasing the resistance of the coil section 230.

Therefore, with the above-described configuration, it is possible to reduce the number of the connection portions between the coil section 230 and the upper or lower spring, thus improving assemblability. Moreover, it becomes possible to decrease the current density of the coil by the increase in resistance, so that the loss due to the heat generation in the coil section 230 can be reduced. As a result, a good optical image is formed on the imaging element 3 at all times, so that it becomes possible to provide a high-efficiency and high-reliability camera module that can achieve an excellent image quality.

Although the embodiment shown in FIG. 14 is directed to the case where the coil section includes two coils, the number of the coils is not limited as long as N coils (N is an even number) wound in the same direction are provided. It is only necessary that the winding start position and the winding finish position of each of the N coils are arranged with a phase shift of 180° between adjacent ones of the permanent magnets 31*a*, 31*b*, 31*c*, and 31*d* along the arrangement direction of the permanent magnets and the N coils have a plurality of pairs of coils whose winding start positions are positioned with a phase shift of 180°.

Ninth Embodiment

Figure 15A:
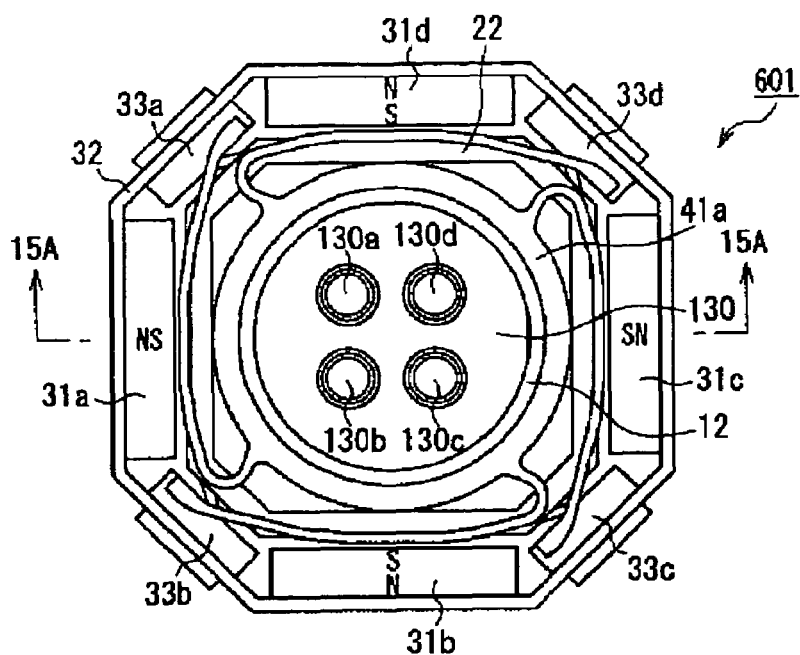
[FIG. 15]
Figure 15B:
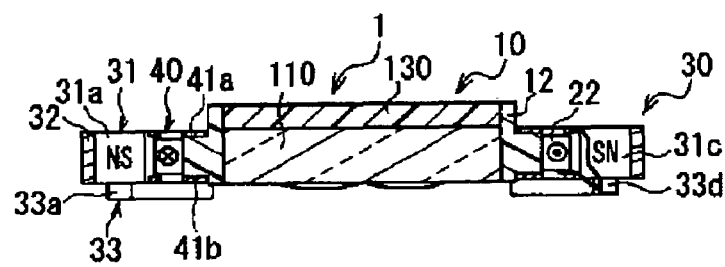
Figure 15C:
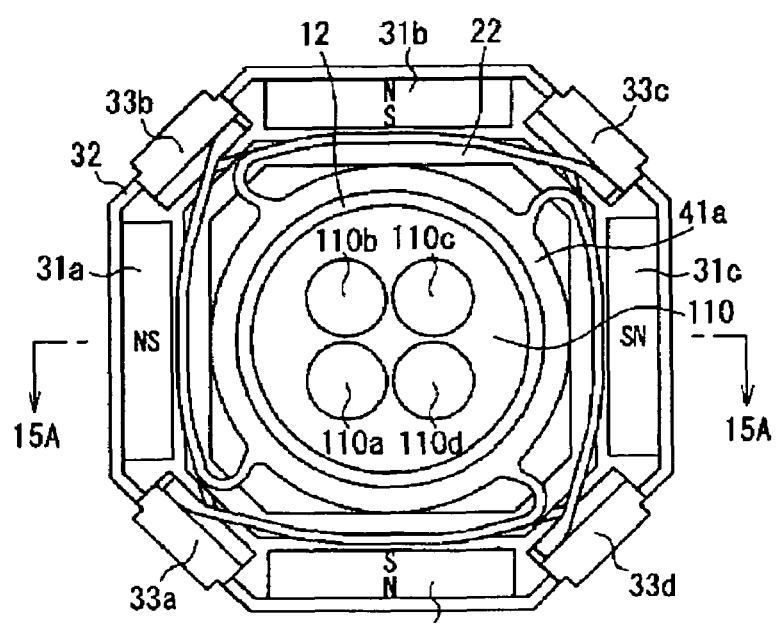

Next, a camera module according to a ninth embodiment of the present invention will be described with reference to the drawings. FIG. 15 shows the configuration of the camera module according to the present embodiment. FIG. 15A is a plan view showing the configuration of the camera module according to the present embodiment, FIG. 15C is a bottom view showing the configuration of the camera module (a substrate is not shown), and FIG. 15B is a sectional view taken in the arrow direction of line 15A-15A in FIGS. 15A and 15C.

A camera module 601 of the present embodiment shown in FIG. 15 has the same configuration as the camera module of the first embodiment (FIG. 1) except that a lens portion 110 and a lens hood portion 130 are used instead of the lens 11 and the lens hood 13. Therefore, components having the same function as those of the camera module of the first embodiment are given the same reference numerals and the description thereof has been omitted. Also, the automatic focusing control operation is performed in the same manner as that in the camera module of the first embodiment, and the description thereof thus has been omitted.

As shown in FIG. 15, in the camera module 601 of the present embodiment, the lens portion 110 has four lenses 110*a*, 110*b*, 110*c*, and 110*d* that are arranged on the same plane perpendicular to the optical axis. In the lens hood portion 130, holes 130*a*, 130*b*, 130*c*, and 130*d* for allowing passage of incident light from an object are formed on optical axes of the four lenses 110*a*, 110*b*, 110*c*, and 110*d* of the lens portion 110, respectively. That is, the optical axes of the four lenses 110*a*, 110*b*, 110*c*, and 110*d* of the lens portion 110 coincide with the centers of the holes 130*a*, 130*b*, 130*c*, and 130*d*, respectively. The holes 130*a*, 130*b*, 130*c*, and 130*d* are processed so that their diameters are tapered stepwise toward the center of the lenses 110*a*, 110*b*, 110*c*, and 110*d*, respectively, when the lens hood portion 130 is viewed in the plan view of FIG. 15A.

Since the four lenses 110*a*, 110*b*, 110*c*, and 110*d* are provided in the camera module 601 of the in the present embodiment as described above, four object images are formed on light-receiving surface of an imaging element 3 (see FIG. 1B). Note here that the four lenses 110*a*, 110*b*, 110*c*, and 110*d* are arranged so that the center positions thereof substantially coincide with the center of the light-receiving surface of the imaging element 3. The arithmetic element 4 (see FIG. 1B) converts an electric signal inputted thereto from the imaging element 3 into a digital value. Thereafter, the arithmetic element 4 cuts out a region corresponding to each of the lenses 110*a*, 110*b*, 110*c*, and 110*d* and performs image processing as appropriate In this case, the arithmetic element 4 can perform, for example, length measurement by stereo vision, in addition to the processing achieved by a camera module provided with a single lens.

Even in the case where the camera module has such a pantoscopic optical system, it is possible to realize a very small thickness that does not depend on the thickness of the permanent magnet portion 31 etc. by applying the configuration of the present invention. Thus, it becomes possible to provide a high-reliability camera module in which the occurrence of misalignment of optical axes between the lenses 110*a*, 110*b*, 110*c*, and 110*d* and the imaging element 3 and tilt are suppressed remarkably.

Although the arithmetic element 4 cuts out four regions using the single imaging element 3 in the present embodiment, four imaging elements may be used. The four imaging elements may be arranged such that the centers of light-receiving surfaces of these four imaging elements substantially coincide with the centers of the optical axes of the lenses 110*a*, 110*b*, 110*c*, and 110*d*, so that object images from the lenses 110*a*, 110*b*, 110*c*, and 110*d* are formed on the light-receiving surfaces of the respective imaging elements.

Tenth Embodiment

It should be noted that materials, configurations, etc. specifically given in the first to ninth embodiments merely are illustrative and the present invention is by no means limited thereto. For example, the upper spring and the lower spring may have a shape other than those given above, and the number of arms provided in the upper spring and lower spring may be two or three. Also, an optical system obtained by combining a plurality of optical systems arranged along the optical axis direction may be used. Moreover, the configurations of the first to ninth embodiments may be combined as appropriate.

Hereinafter, modified examples of the shape etc. of the upper spring and the lower spring will be described.

Figure 16:
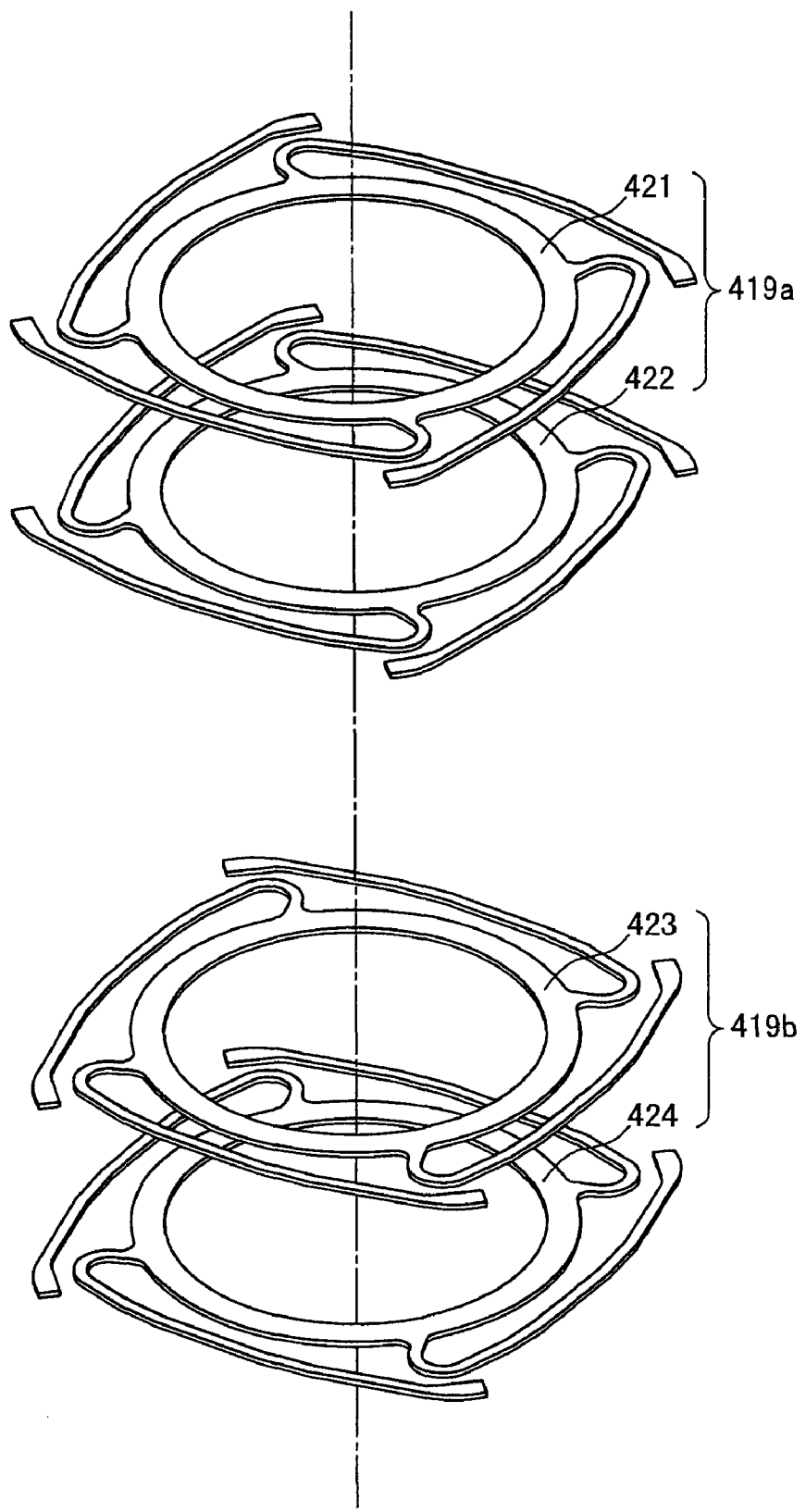
[FIG. 16]

In the first to ninth embodiments, each of the upper spring and the lower spring is a member (hereinafter referred to as "a spring member") obtained by etching or punching out a single plate-like member. However, the upper spring and the lower spring are not necessarily limited thereto. For example, as shown in FIG. 16, an upper spring 419*a* may be composed of at least two spring members 421 and 422 having the same shape, and a lower spring 419*b* may be composed of at least two spring members 423 and 424. In this case, an annular portion, a movable section-supporting end portion, and a fixed section-supporting end portion of the spring member 421 are fixed firmly to an annular portion, a movable section-supporting end portion, and a fixed section-supporting end portion of the spring member 422, respectively. However, their arm portions are not fixed firmly to each other. Similarly, with regard the spring member 423 and the spring member 424, although their annular portions, movable section-supporting end portions, and fixed section-supporting end portions are fixed firmly to each other, their arm portions are not fixed firmly to each other.

When the upper spring and the lower spring are configured as above, vertical vibrations of the arm portions of the two or more spring members in the optical axis direction collide against with each other, whereby ringing in the movable section 10 (see FIG. 1B) can be suppressed.

Figure 17:
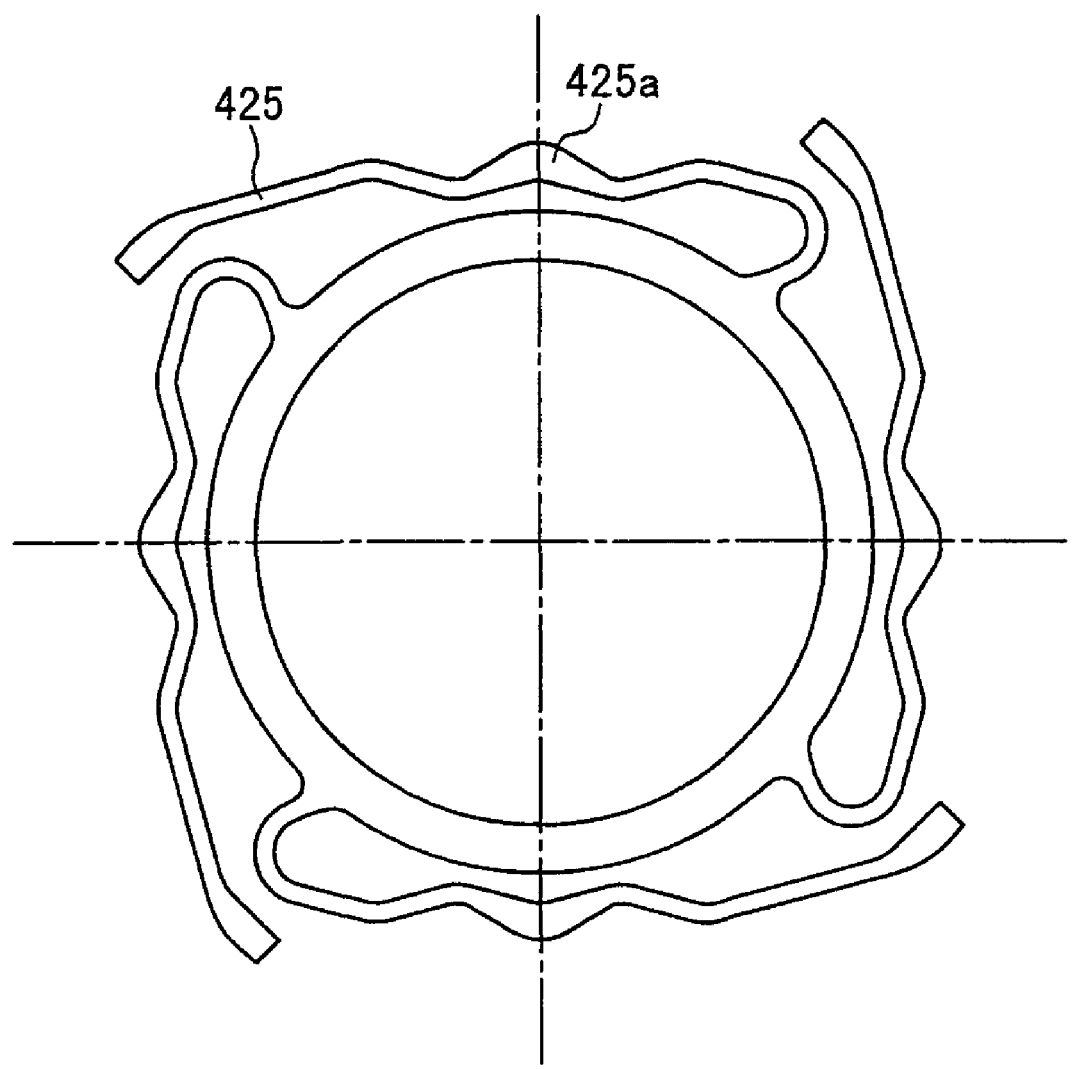
[FIG. 17]

Although the respective arm portions of the upper spring and the lower spring are formed so as to have a constant width in the first to ninth embodiments, the upper spring (or the lower spring) may have arm portions 425 whose widths are not constant as shown in FIG. 17, for example. By providing a wide portion 425*a* particularly at a portion where stress is concentrated in the arm portion 425, it is possible to relieve stress, thus improving the reliability of the camera module.

Figure 18A:
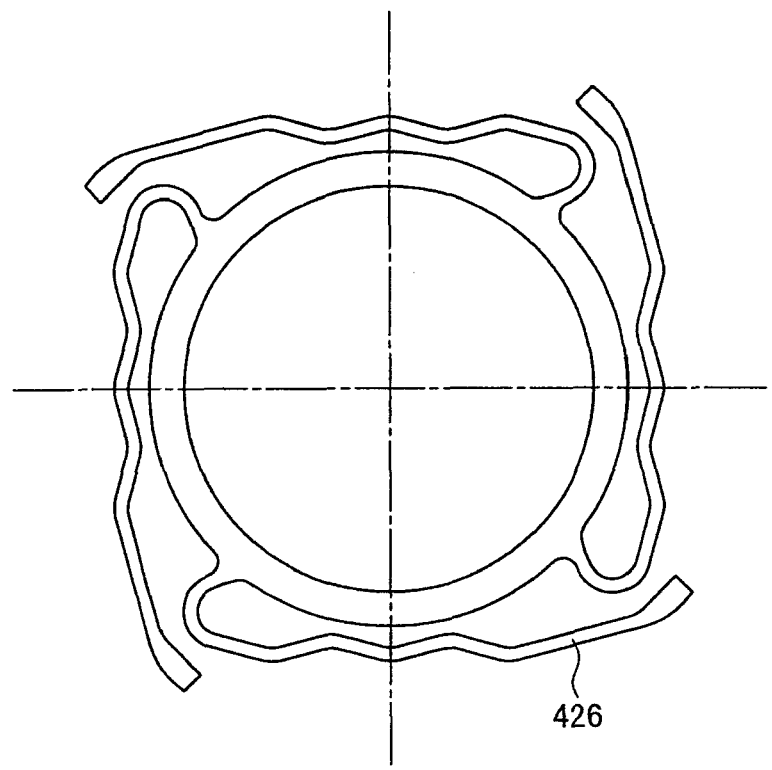
FIG. 18A is a plan view showing another example of the upper spring included in the elastic body of the camera module according to the tenth embodiment of the present invention.
Figure 18B:
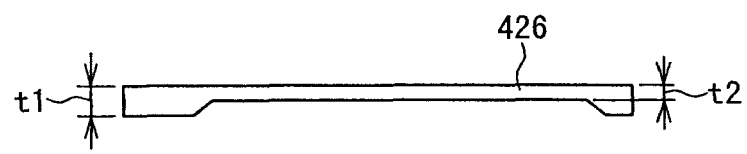
FIG. 18B is a side view showing an arm portion of this upper spring.

Furthermore, although the respective arm portions of the upper spring and the lower spring are formed so as to have a constant thickness in the first to ninth embodiments, the upper spring (or the lower spring) may have arm portions 426 whose thicknesses are not constant as shown in FIGS. 18A and 18B, for example (In FIG. 8B, t1 and t2 represent thicknesses, and t1>t2). By providing a thick portion (a portion with the thickness t1) particularly at a portion where stress is concentrated in the arm portion 426, it is possible to relieve stress, thus improving the reliability of the camera module.

Figure 19:
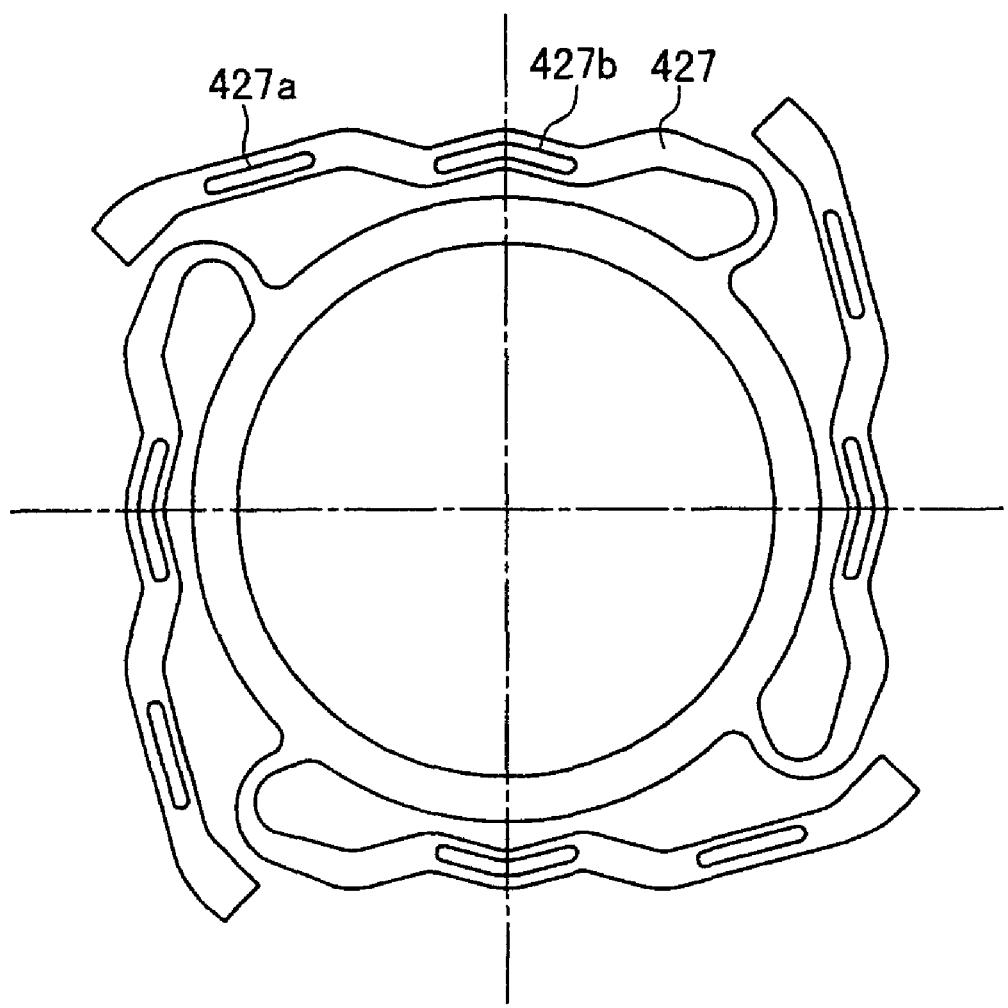
[FIG. 19]

The stress relieving also can be achieved by providing slits 427*a* and 427*b* at a portion where stress is concentrated in an arm portion 427 as shown in FIG. 19, for example.

Figure 20A:
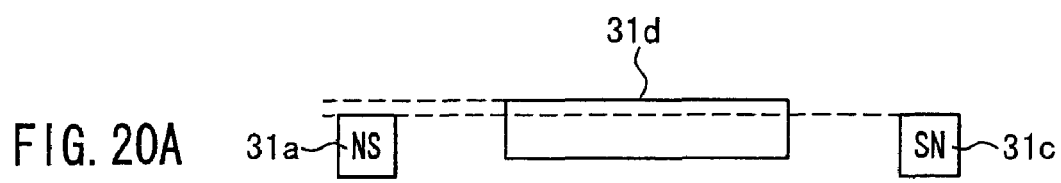
FIG. 20A is a side view showing the positional relationship between respective permanent magnets in the camera module according to a tenth embodiment of the present invention.
Figure 20B:
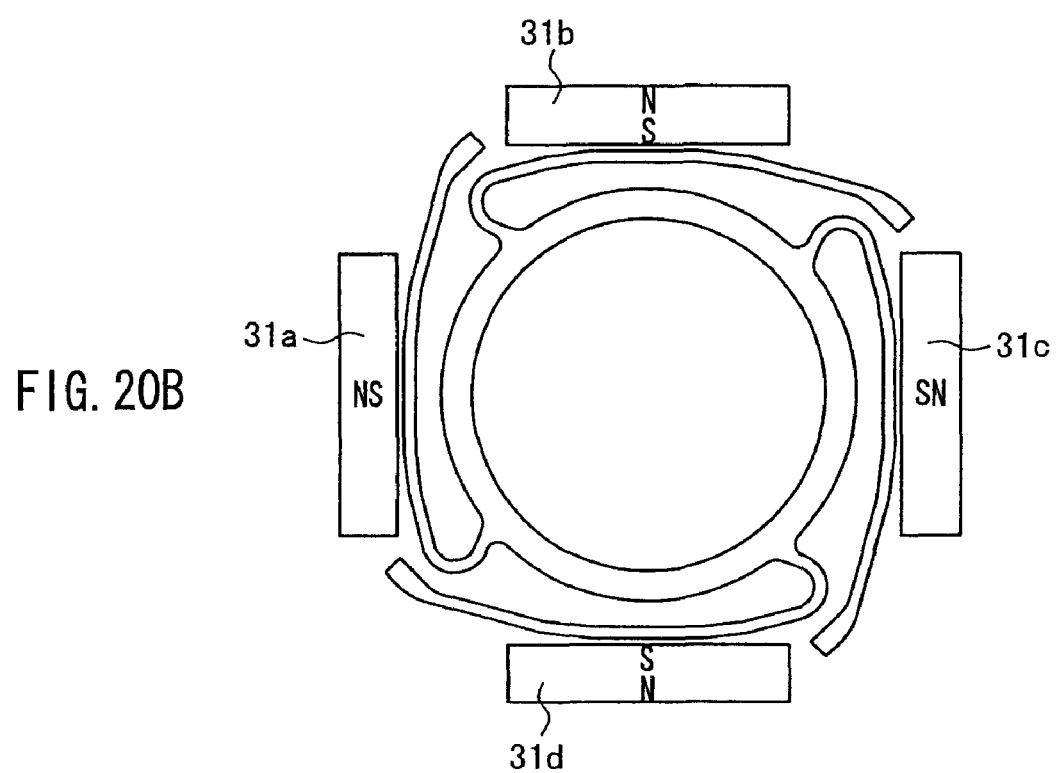
FIG. 20B is a plan view of the same.
Figure 21:
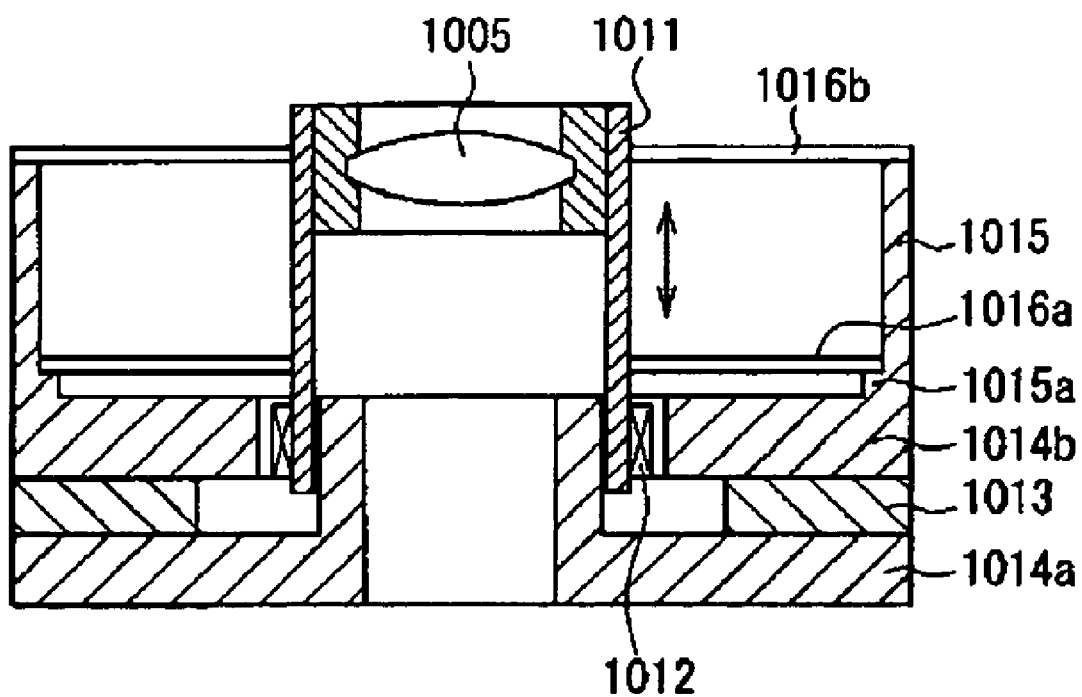
[FIG. 21]

Furthermore, although the first to ninth embodiments are directed to the case where the permanent magnets 31*a*, 31*b*, 31*c*, and 31*d* included in the permanent magnet portion 31 are arranged on the same plane perpendicular to the optical axis of the lens 11, the present invention is not necessarily limited to such a configuration. For example, as shown in FIG. 20, the permanent magnets 31*a* and 31*c* (or the permanent magnets 31*b* and 31*d*) facing each other may be arranged on the same plane perpendicular to the optical axis of the lens 11, and the adjacent permanent magnets (e.g., the permanent magnets 31*a* and 31*b*) may be arranges so as to be displaced in the optical axis direction of the lens 11. This applies to the case where four or more permanent magnets are used.

The amount by which the movable section 10 (see FIG. 1B) moves substantially is proportional to an interaction (Lorentz force) of magnetic fluxes generated by the respective permanent magnets and the current flowing through the coil of the coil section. Thus, by configuring the camera module as above, it becomes possible to increase the amount by which the movable section 10 moves. In this case, by setting the positions of the upper spring and the lower spring in the optical axis direction of the lens 11 (see FIG. 1B etc.) between an object-side end portion of the permanent magnets 31*a*, 31*b*, 31*c*, and 31*d* as a whole (in this case, the upper end portion of the permanent magnets 31*b* and 31*d*) and an end portion on the opposite side (in this case, the lower end portion of the permanent magnets 31*a* and 31*c*), it becomes possible to provide a camera module with an automatic focusing control function, whose thickness has been reduced remarkably.

Although the above embodiments are directed to the case where the elastic body includes the upper spring and the lower spring, it is only necessary that the elastic body includes at least one spring.

INDUSTRIAL APPLICABILITY

The camera module according to the present invention is a thin and highly reliable camera module with an automatic focusing control function, capable of achieving low power consumption. Thus, the camera module of the present invention is useful for cellular phones with a camera function, digital still cameras, surveillance cameras, etc.

The invention claimed is:

1. A camera module comprising:
   a movable section that comprises at least one lens and can be moved in an optical axis direction of the lens;
   a fixed section having a hollow space extending in the optical axis direction of the lens so as to allow movement of the movable section;
   at least one elastic body that elastically supports the movable section and the fixed section;
   an imaging element that is fixed to the fixed section and has a light-receiving surface substantially perpendicular to the optical axis of the lens;
   a plurality of magnets arranged along the fixed section;
   a coil provided in the movable section;
   a driving element for supplying electric power to the coil; and
   an arithmetic element that performs image processing based on an electric signal input to the arithmetic element from the imaging element,
   wherein the fixed section supports the elastic body between adjacent ones of the magnets along an arrangement direction of the magnets,
   the elastic body comprises an annular portion fixed firmly to the movable section and a plurality of arms, each having at least one bent portion, the plurality of arms connecting the annular portion and the fixed section
   the elastic body supports the movable section and the fixed section elastically with the annular portion and the plurality of arms, and
   each of the arms is arranged between the movable section and the magnet extending from an ear between one pair of adjacent ones of the magnets to an area between another pair of adjacent ones of the magnets.

2. The camera module according to claim 1, wherein the elastic body is arranged between an object-side end portion and an end portion on a side opposite to the object-side end portion of the plurality of magnets as a whole.

3. The camera module according to claim 1, wherein the bent portion forms an angle in a range from 120° to 150°.

4. The camera module according to claim 1, wherein each of the arms has a movable section-supporting end portion for supporting the movable section, a fixed section-supporting end portion for supporting the fixed section, and an arm portion for connecting the movable section-supporting end portion and the fixed section-supporting end portion, and each of the arm portions has the bent portions arranged so as to be symmetrical between adjacent ones of the fixed section-supporting end portions on a plane perpendicular to the optical axis of the lens.

5. The camera module according to claim 1, wherein each of the arms has a plurality of said bent portions, and the bent portions are arranged so that the bent portions form the same angle and lengths between adjacent ones of the bent portions are the same.

6. The camera module according to claim 1, wherein each of the arms has a movable section-supporting end portion for supporting the movable section, and the movable section-supporting end portion branches into at least two parts.

7. The camera module according to claim 1, wherein each of the arms is connected to the annular portion via the movable section-supporting end portion, and the annular portion has a plurality of cut-away portions between adjacent ones of the movable section-supporting end portions.

8. The camera module according to claim 1, wherein the coil is wound around an outer periphery of the movable section so as to face the plurality of magnets, a winding start position and a winding finish position of the coil are on the same axis that is substantially parallel to the optical axis of the lens between adjacent ones of the magnets along the arrangement direction of the magnets.

9. The camera module according to claim 1, wherein the coil comprises N coils (N is an even number) wound in the same direction around an outer periphery of the movable section so as to face the plurality of magnets, a winding start position and a winding finish position of each of the N coils are positioned with a phase shift of 180° between adjacent ones of the magnets along the arrangement direction of the magnets, and the N coils have a plurality of pairs of coils whose winding start positions are positioned with a phase shift of 180°.

* * * * *

UNITED STATES PATENT AND TRADEMARK OFFICE
CERTIFICATE OF CORRECTION

| | | |
|---|---|---|
| PATENT NO. | : 7,675,566 B2 | Page 1 of 1 |
| APPLICATION NO. | : 11/814054 | |
| DATED | : March 9, 2010 | |
| INVENTOR(S) | : Tagome et al. | |

It is certified that error appears in the above-identified patent and that said Letters Patent is hereby corrected as shown below:

Column 24, line 32 (claim 1): "an ear" should read --an area--.

Signed and Sealed this

Sixteenth Day of November, 2010

David J. Kappos
*Director of the United States Patent and Trademark Office*